US012639400B2

(12) United States Patent
Ding et al.

(10) Patent No.: US 12,639,400 B2
(45) Date of Patent: May 26, 2026

(54) EXTREMA-PRESERVED ENSEMBLE AVERAGING FOR ML ANOMALY DETECTION

(71) Applicant: ORACLE INTERNATIONAL CORPORATION, Redwood Shores, CA (US)

(72) Inventors: Zejin Ding, Atlanta, GA (US); Matthew T. Gerdes, Oakland, CA (US); Kenny C. Gross, Escondido, CA (US); Guang Chao Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 690 days.

(21) Appl. No.: 17/881,864

(22) Filed: Aug. 5, 2022

(65) Prior Publication Data

US 2024/0045927 A1    Feb. 8, 2024

(51) Int. Cl.
    *G06F 18/214*     (2023.01)
    *G01M 99/00*     (2011.01)
    *G06N 20/00*     (2019.01)

(52) U.S. Cl.
    CPC ......... *G06F 18/214* (2023.01); *G01M 99/005* (2013.01); *G06N 20/00* (2019.01); *G06F 2218/10* (2023.01)

(58) Field of Classification Search
    CPC .......... G06N 20/00; G06N 7/01; G06N 20/10; G06N 5/01; G06N 3/08; G06N 3/126;
    (Continued)

(56) References Cited

U.S. PATENT DOCUMENTS

| 4,686,655 | A | 8/1987 | Hyatt |
| 7,020,802 | B2 | 3/2006 | Gross et al. |
| | | (Continued) | |

FOREIGN PATENT DOCUMENTS

| CN | 107181543 | A | 9/2017 |
| CN | 110941020 | A1 | 3/2020 |
| DE | 4447288 | A1 | 7/1995 |

OTHER PUBLICATIONS

Gross, Kenny, Oracle Labs; MSET2 Overview: "Anomaly Detection and Prediction" Oracle Cloud Autonomous Prognostics; p. 1-58; Aug. 8, 2019.

(Continued)

*Primary Examiner* — Catherine T. Rastovski
*Assistant Examiner* — Brian Butler Geiss
(74) *Attorney, Agent, or Firm* — Kraguljac Law Group LLC

(57) ABSTRACT

Systems, methods, and other embodiments associated with associated with preserving signal extrema for ML model training when ensemble averaging time series signals for ML anomaly detection are described. In one embodiment, a method includes identifying locations and values of extrema in a training signal; ensemble averaging the training signal to produce an averaged training signal; placing the values of the extrema into the averaged training signal at respective locations of the extrema to produce an extrema-preserved averaged training signal; placing the values of the extrema into the averaged training signal at respective locations of the extrema to produce an extrema-preserved averaged training signal; and training a machine learning model using the extrema-preserved averaged training signal to detect anomalies in a signal.

20 Claims, 6 Drawing Sheets

(58) Field of Classification Search

CPC .......... G06N 5/04; G06N 5/047; G06N 20/20;
G06N 3/044; G06N 3/045; G06N 3/084;
G06N 3/088; G06N 5/048; G06F 17/18;
G06F 18/214; G01M 99/005

See application file for complete search history.

(56) References Cited

U.S. PATENT DOCUMENTS

| | | | |
|---|---|---|---|
| 7,191,096 | B1 | 3/2007 | Gross et al. |
| 7,281,112 | B1 | 10/2007 | Gross et al. |
| 7,292,659 | B1 | 11/2007 | Gross et al. |
| 7,391,835 | B1 | 6/2008 | Gross et al. |
| 7,542,995 | B2 | 6/2009 | Thampy et al. |
| 7,573,952 | B1 | 8/2009 | Thampy et al. |
| 7,613,576 | B2 | 11/2009 | Gross et al. |
| 7,613,580 | B2 | 11/2009 | Gross et al. |
| 7,702,485 | B2 | 4/2010 | Gross et al. |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,150,655 | B2 | 4/2012 | Dhanekula et al. |
| 8,200,991 | B2 | 6/2012 | Vaidyanathan et al. |
| 8,214,682 | B2 | 7/2012 | Vaidyanathan et al. |
| 8,275,738 | B2 | 9/2012 | Gross et al. |
| 8,341,759 | B2 | 12/2012 | Gross et al. |
| 8,365,003 | B2 | 1/2013 | Gross et al. |
| 8,457,913 | B2 | 6/2013 | Zwinger et al. |
| 8,543,346 | B2 | 9/2013 | Gross et al. |
| 9,514,213 | B2 | 12/2016 | Wood et al. |
| 9,933,338 | B2 | 4/2018 | Noda et al. |
| 10,015,139 | B2 | 7/2018 | Gross et al. |
| 10,452,510 | B2 | 10/2019 | Gross et al. |
| 10,496,084 | B2 | 12/2019 | Li et al. |
| 10,860,011 | B2 | 12/2020 | Gross et al. |
| 10,929,776 | B2 | 2/2021 | Gross et al. |
| 11,042,428 | B2 | 6/2021 | Gross et al. |
| 11,055,396 | B2 | 7/2021 | Gross et al. |
| 11,255,894 | B2 | 2/2022 | Wetherbee et al. |
| 11,392,786 | B2 | 7/2022 | Gross et al. |
| 2003/0061008 | A1 | 3/2003 | Smith et al. |
| 2008/0140362 | A1 | 6/2008 | Gross et al. |
| 2008/0252309 | A1 | 10/2008 | Gross et al. |
| 2008/0252441 | A1 | 10/2008 | McElfresh et al. |
| 2008/0256398 | A1 | 10/2008 | Gross et al. |
| 2009/0099830 | A1 | 4/2009 | Gross et al. |
| 2009/0125467 | A1 | 5/2009 | Dhanekula et al. |
| 2009/0306920 | A1 | 12/2009 | Zwinger et al. |
| 2010/0023282 | A1 | 1/2010 | Lewis et al. |
| 2010/0033386 | A1 | 2/2010 | Lewis et al. |
| 2010/0161525 | A1 | 6/2010 | Gross et al. |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2013/0157683 | A1 | 6/2013 | Lymberopoulos et al. |
| 2015/0137830 | A1 | 5/2015 | Keller, III et al. |
| 2016/0098561 | A1 | 4/2016 | Keller et al. |
| 2017/0163669 | A1 | 6/2017 | Brown et al. |
| 2018/0011130 | A1 | 1/2018 | Aguayo Gonzalez et al. |
| 2018/0276044 | A1 | 9/2018 | Fong et al. |
| 2018/0349797 | A1 | 12/2018 | Garvey et al. |
| 2019/0102718 | A1 | 4/2019 | Agrawal |
| 2019/0163719 | A1 | 5/2019 | Gross et al. |
| 2019/0196892 | A1 | 6/2019 | Matei et al. |
| 2019/0197145 | A1 | 6/2019 | Gross et al. |
| 2019/0237997 | A1 | 8/2019 | Tsujii et al. |
| 2019/0243799 | A1 | 8/2019 | Gross et al. |
| 2019/0286725 | A1 | 9/2019 | Gawlick et al. |
| 2019/0378022 | A1 | 12/2019 | Wang et al. |
| 2020/0125819 | A1 | 4/2020 | Gross et al. |
| 2020/0201950 | A1 | 6/2020 | Wang et al. |
| 2020/0387753 | A1 | 12/2020 | Brill et al. |
| 2021/0081573 | A1 | 3/2021 | Gross et al. |
| 2021/0158202 | A1 | 5/2021 | Backlawski et al. |
| 2021/0174248 | A1 | 6/2021 | Wetherbee et al. |
| 2021/0270884 | A1 | 9/2021 | Wetherbee et al. |
| 2022/0121955 | A1* | 4/2022 | Chavoshi .............. G06N 3/088 |
| 2022/0138499 | A1* | 5/2022 | Wang ................. G06F 11/3075 |
| | | | 382/159 |

OTHER PUBLICATIONS

Gross, K. C. et al., "Application of a Model-Based Fault Detection System to Nuclear Plant Signals," downloaded from https://www.researchgate.net/publication/236463759; Conference Paper: May 1, 1997, 5 pages.

Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.

Patent Cooperation Treaty (PCT), International Search Report and Written Opinion issued in PCT International Application No. PCT/US2020/060083 having a date of mailing of Mar. 19, 2021 (13 pgs).

Patent Cooperation Treaty (PCT), International Search Report and Written Opinion issued in PCT International Application No. PCT/US2021/015802 having a date of mailing of May 28, 2021 (13 pgs).

Patent Cooperation Treaty (PCT), International Search Report and Written Opinion issued in PCT International Application No. PCT/US2021/013633 having a date of mailing of May 6, 2021 (10 pgs).

Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Patent Cooperation Treaty (PCT), International Search Report and Written Opinion issued in PCT International Application No. PCT/US2021/014106 having a date of mailing of Apr. 26, 2021 (9 pgs).

Patent Cooperation Treaty (PCT), International Search Report and Written Opinion issued in PCT International Application No. PCT/US2021/015359 having a date of mailing of Apr. 9, 2021 (34 pgs).

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Gou, Yuhua, "Implementation of 3d Kiviat Diagrams." (2008). (Year: 2008).

Wang, Ray C., et al., Process Fault Detection Using Time-Explicit Kiviat Diagrams. AlChE Journal 61.12 (2015): 4277-4293.

Whisnant et al.; "Proactive Fault Monitoring in Enterprise Servers," IEEE—International Multiconference in Computer Science & Computer Engineering (Jun. 27-30, 2005) 11 pgs.

US Nuclear Regulatory Commission; "Technical Review of On-Line Monitoring Techniques for Performance Assessment," vol. 1, Jan. 31, 2006.

Gribok, et al., "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

Wald, A, "Sequential Probability Ratio Test for Reliability Demonstration", John Wiley & Sons, 1947.

Patent Cooperation Treaty (PCT), International Search Report and Written Opinion issued in PCT International Application No. PCT/US2021/062380 having a date of mailing of May 24, 2022 (10 pgs).

Patent Cooperation Treaty (PCT), PCT International Search Report and Written Opinion issued in PCT Application No. PCT/US2023/

(56) References Cited

OTHER PUBLICATIONS

029268, PCT International Filing Date Aug. 2, 2023, having a Date of Mailing of Nov. 14, 2023 (16 pgs).

Sutrisno Edwin: "Midimax Compression for Large Time-Series Data", dated Apr. 18, 2022, pp. 1-8, retrieved from the Internet at: URL:http://towardsdatascience.com/midimax-data-compression-for-large-time-series-data-daf744c89310, retrieval date Nov. 1, 2023.

Lkhagva B et al: "New Time Series Data Representation ESAX for Financial Applications", Data Engineering Workshops 2006, Proceedings 22nd International Conference on Atlanta GA, USA Apr. 3-7, 2006 Piscataway, NJ, USA IEEE. (6 pgs.).

Choi Kukjin et al: "Deep Learning for Anomaly Detection in Time-Series Data: Review, Analysis, and Guidelines", IEEE Access, IEEE, USA, vol. 9, Aug. 26, 2021, pp. 120043-120065.

Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

Abebe Diro et al.; A Comprehensive Study of Anomaly Detection Schemes in IoT Networks Using Machine Learning Algorithms; pp. 1-13; 2021; downloaded from: https://doi.org/10.3390/s21248320.

Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.

Patent Cooperation Treaty (PCT) International Preliminary Report on Patentability issued in PCT International Application PCT/US2023/029268 (International filing date Aug. 2, 2023) having an issue date of Feb. 4, 2025 (11 pgs).

\* cited by examiner

200

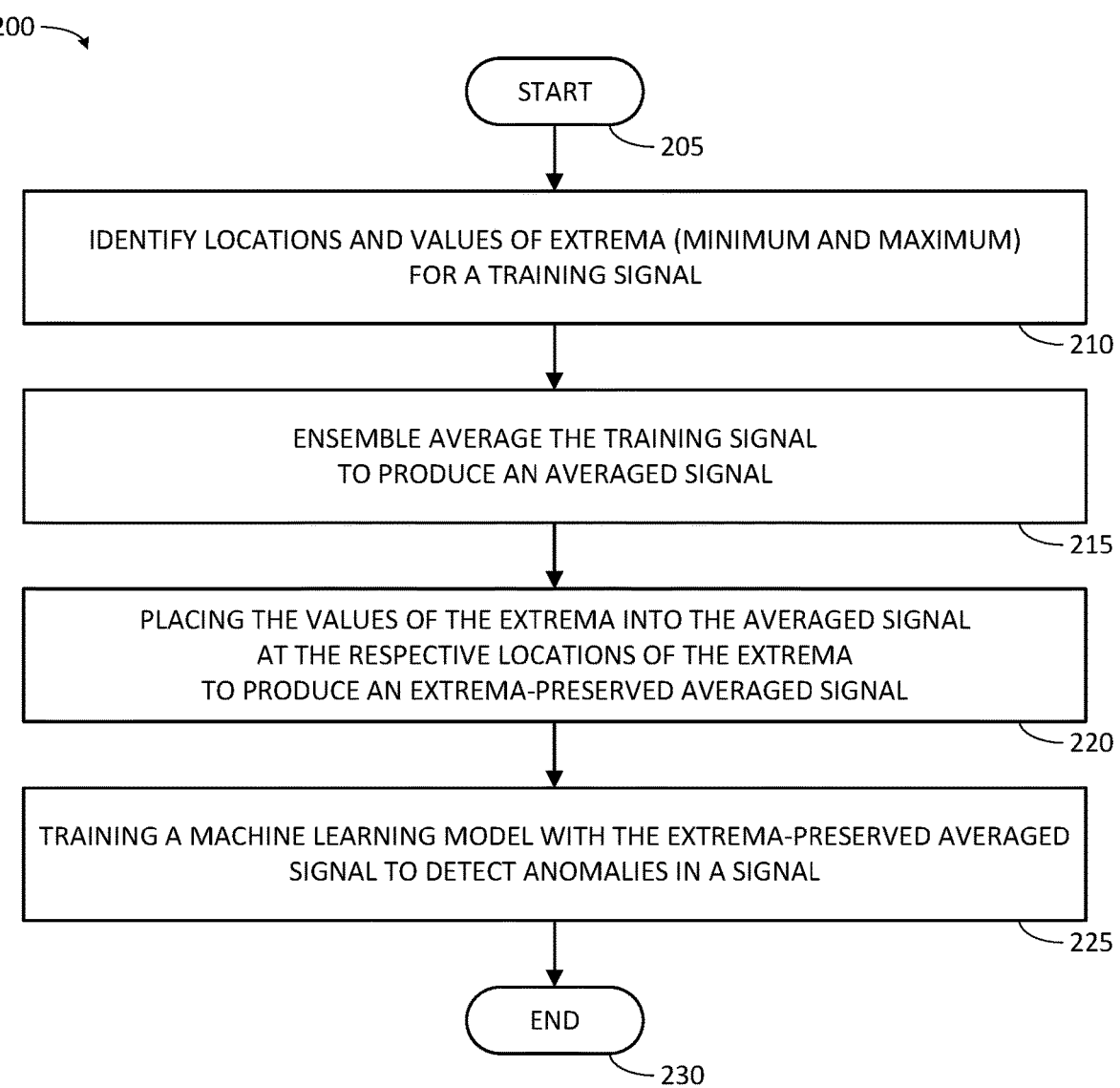

START

205

IDENTIFY LOCATIONS AND VALUES OF EXTREMA (MINIMUM AND MAXIMUM) FOR A TRAINING SIGNAL

210

ENSEMBLE AVERAGE THE TRAINING SIGNAL TO PRODUCE AN AVERAGED SIGNAL

215

PLACING THE VALUES OF THE EXTREMA INTO THE AVERAGED SIGNAL AT THE RESPECTIVE LOCATIONS OF THE EXTREMA TO PRODUCE AN EXTREMA-PRESERVED AVERAGED SIGNAL

220

TRAINING A MACHINE LEARNING MODEL WITH THE EXTREMA-PRESERVED AVERAGED SIGNAL TO DETECT ANOMALIES IN A SIGNAL

225

END

EXTREMA-PRESERVED ENSEMBLE AVERAGING FOR ML ANOMALY DETECTION

BACKGROUND

Large numbers of sensors may be used to monitor the operations of a wide variety of assets, such as data centers, passenger aircraft, and oil refineries. The time series data or signals from the sensors can be used in machine learning (ML) time series prognostic surveillance to detect incipient failure of the monitored asset before the failure occurs. This makes it possible to take corrective action before failure of the monitored asset.

The capacity for accumulation of time series data is outpacing processing power in the cloud. The compute cost (in processor time and memory) of analyzing sample-dense time series signals can be exorbitant. For large-scale machine learning (ML) use cases involving hundreds of thousands of time series signals, the processing requirements for training an ML model can be beyond the capacity of cloud computing systems.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 2 illustrates one embodiment of an extrema-preserved ensemble averaging method associated with preserving signal extrema for ML model training when ensemble averaging time series signals for ML anomaly detection.

DETAILED DESCRIPTION

Systems, methods, and other embodiments are described herein that provide for preserving signal extrema when ensemble averaging time series signals for training ML models. In one embodiment, an extrema-preserved ensemble averaging system retains the observed minimum value and maximum value when ensemble averaging a time series signal to be used for training an ML model. Retaining these extrema at the locations where they occur and using them in place of the averaged values for those locations during model training dramatically reduces false alarm probabilities (FAPs) in the ML model.

In one embodiment, an extrema-preserved ensemble averaging system identifies locations of the extrema in a training signal. The training signal is then ensemble averaged to produce an averaged signal, potentially losing the extrema. The extrema are then placed back into the averaged signal at the respective locations where the extrema occurred. A machine learning model is then trained to detect anomalies with this extrema-preserved averaged signal.

In one embodiment, as used herein, the term "extrema" refers to the minimum value and maximum value over a portion of a signal. In one embodiment, as used herein, the term "ensemble averaging" refers to generating an average value for blocks of adjacent time steps in the signal, rather than to generating an average across multiple signals.

As used herein, the term "time series signal" refers to a data structure in which a series of data points (such as observations or sampled values) are indexed in time order. In one embodiment, the data points of a time series signal may be indexed with a time stamp and/or an observation number. In one embodiment, data points of a time series signal recur at a uniform or consistent interval.

As used herein, the term "time series database" refers to a data structure that includes one or more time-series signals sharing an index (such as a series of time stamps or observation numbers) in common.

—Example Extrema—Preserved Ensemble Averaging System—

Figure 1:
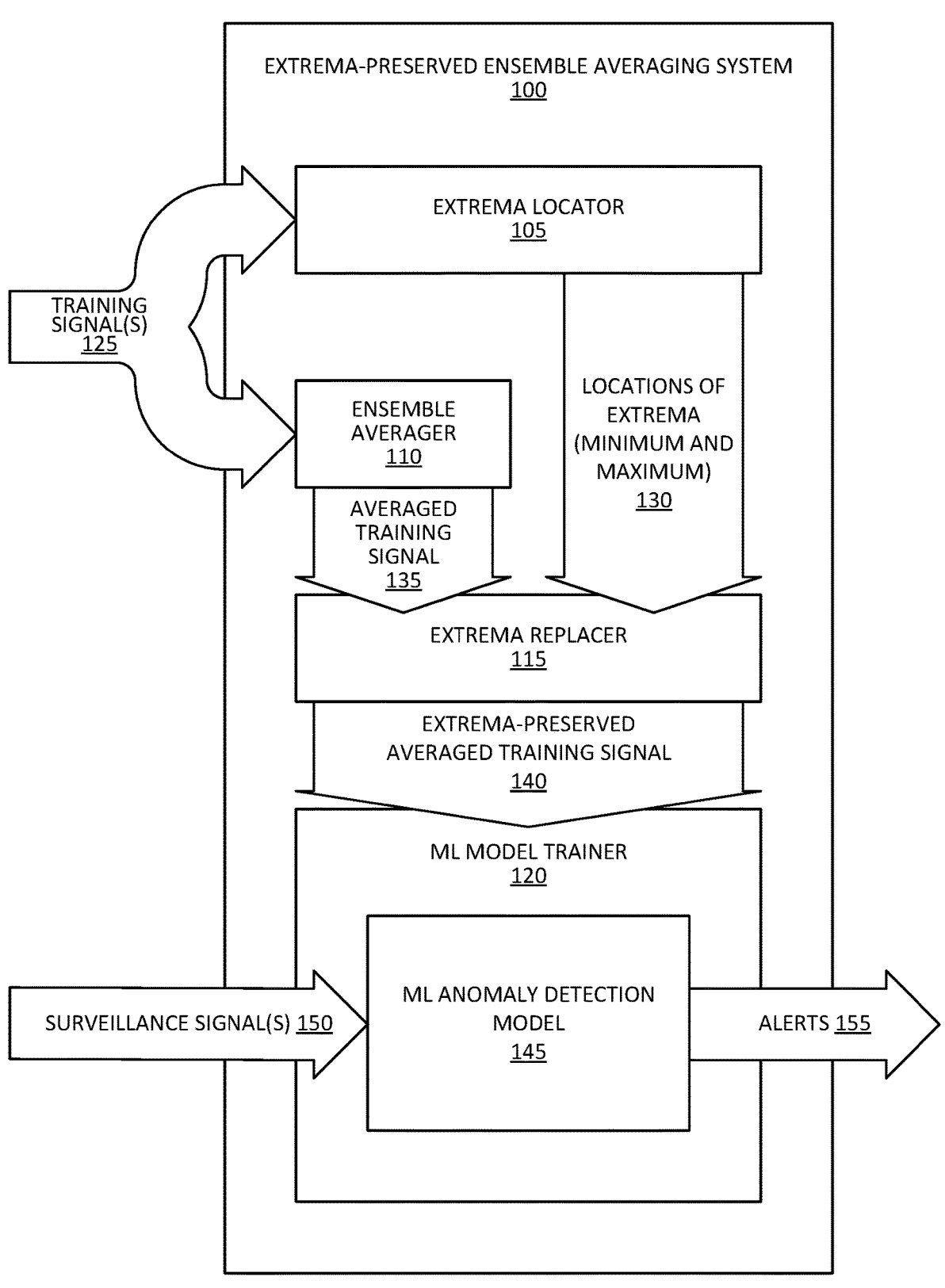
FIG. 1 illustrates one embodiment of an extrema-preserved ensemble averaging system associated with preserving signal extrema for ML model training when ensemble averaging time series signals for ML anomaly detection.

FIG. 1 illustrates one embodiment of an extrema-preserved ensemble averaging system 100 associated with preserving signal extrema for ML model training when ensemble averaging time series signals for ML anomaly detection. Extrema-preserved ensemble averaging system 100 includes an extrema locator 105, an ensemble average 110, an extrema replacer 115, and an ML model trainer 120. In one embodiment each of these components 105, 110, 115, and 120 of extrema-preserved ensemble averaging system 100 may be implemented as modules.

In one embodiment, extrema locator 105 is configured to identify locations of extrema for a training signal 125. In one embodiment, extrema locator 105 is configured to accept (or retrieve from memory or storage) training signal 125. In one embodiment, training signal 125 is a time series signal. In one embodiment, training signal 125 is one signal among multiple signals in a training database, in which case, extrema locator 105 is configured to distinguish training signal 125 from among other signals in the training database. In one embodiment, the training database is a time series database.

In one embodiment, extrema locator 105 is configured to parse values of training signal 125 to identify locations of extrema in training signal 125. In one embodiment, the extrema are a maximum value in training signal 125 and a minimum value in training signal 125. In one embodiment, the extrema locator 105 is configured to detect (and record) the maximum value of training signal 125, and record an index location for the maximum value. In one embodiment, the extrema locator 105 is configured to detect (and record) the minimum value of training signal 125, and record an index location for the minimum value. The locations of the extrema (minimum and maximum) 130 and their associated values may then be provided to extrema replacer 115.

In one embodiment, ensemble averager 110 is configured to ensemble average the training signal to produce an averaged training signal. In one embodiment, ensemble averager 110 is configured to accept (or retrieve from memory or storage) training signal 125. In one embodiment, ensemble averager 110 is configured to portion the values of training signal 125 into segments that fit within an averaging window. Ensemble averager 110 is configured to determine the average of the values in the segment, producing an ensemble average for the segment. Ensemble averager 110 is configured to append the determined ensemble average to an averaged training signal 135. Once an ensemble-averaged value has been determined for each segment and appended to averaged training signal 135, averaged training signal 135 is complete and may then be provided to extrema replacer 115.

In one embodiment, extrema replacer 115 is configured to place the extrema into the averaged training signal at the respective locations of the extrema to produce an extrema-preserved averaged training signal. In one embodiment, extrema replacer 115 is configured to accept (or retrieve from memory or storage) both averaged training signal 135 and locations of extrema 130 and values of the extrema. In one embodiment, extrema replacer 115 is configured to determine (i) a minimum location in averaged training signal 135 that corresponds to the location that the minimum appeared in training signal 125, and (ii) a maximum location in averaged training signal 135 that corresponds to the location that the maximum appeared in training signal 125. In one embodiment, extrema replacer 115 is configured to place (i) the minimum value from training signal 125 into averaged training signal 135 at the minimum location, and (ii) the maximum value from training signal 125 into averaged training signal 135 at the maximum location. Thus, in one embodiment, extrema replacer is configured to replace averaged values with the extrema at the positions in averaged training signal 135 that correspond to where the extrema occurred in training signal 125. Thus, in one embodiment, extrema replacer 115 generates an extrema-preserved averaged training signal 140. Extrema-preserved averaged training signal 140 may be used for training an ML model to detect anomalies in ensemble-averaged signals.

In one embodiment, ML model trainer 120 is configured to train a machine learning model using the extrema-preserved averaged training signal to detect anomalies in a signal. In one embodiment, ML model trainer 120 is configured to accept (or retrieve from memory or storage) extrema-preserved averaged signal 140. In one embodiment, ML model trainer 120 is configured to adjust parameters of an ML anomaly detection model 145 so that ML anomaly detection model 145 is configured to predict the values of extrema-preserved averaged training signal 140 within a pre-determined level of accuracy.

In one embodiment, at the completion of training, ML anomaly detection model 145 is configured to detect anomalies in a surveillance signal 150. In one embodiment, ML anomaly detection model 145 is configured to produce an alert 155 in response to detection of an anomaly in surveillance signal 150.

Further details regarding extrema-preserved ensemble averaging system 100 are presented herein. In one embodiment, the operation of extrema-preserved ensemble averaging system 100 will be described with reference to example methods for extrema-preserving ensemble averaging shown in FIGS. 2 and 3. In one embodiment, the operation of extrema locator 105, ensemble averager 110, and extrema replacer 115 on time series signals will be described with reference to signal plots shown in FIGS. 4 and 5. Further details on the operation of extrema-preserved ensemble averaging system 100 are explained herein in the context of experimental validation of effectiveness and accuracy of extrema-preserved ensemble averaging system 100.

—Example Extrema—Preserved Ensemble Averaging Method—

FIG. 2 illustrates one embodiment of an extrema-preserved ensemble averaging method 200 associated with preserving signal extrema for ML model training when ensemble averaging time series signals for ML anomaly detection. In one embodiment, extrema-preserved ensemble averaging method 200 is a method for preserving minimum and maximum values for ML model training when ensemble averaging signal values to reduce signal granularity and smooth the signal.

As an overview, in one embodiment, extrema-preserved ensemble averaging method 200 first identifies the locations of extrema (that is, minimum and maximum signal value) in a training signal. Extrema-preserved ensemble averaging method 200 then ensemble averages the training signal to produce an averaged training signal. Extrema-preserved ensemble averaging method 200 then places the extrema into the averaged training signal at the respective locations of the extrema. For example, in one embodiment, the minimum value is placed into the averaged training signal at the location of the minimum value and the maximum value is placed into the averaged signal at the location of the maximum value. An extrema-preserved averaged training signal is thereby produced. Extrema-preserved ensemble averaging method 200 then trains a machine learning model, using the extrema-preserved averaged training signal, to detect anomalies in a signal.

In one embodiment, extrema-preserved ensemble averaging method 200 initiates at start block 205 in response to a processor of a computer determining one or more of: (i) a training signal (e.g. training signal 125) or signal database including one or more training signals has been provided to extrema-preserved ensemble averaging system 100; (ii) a user or administrator of extrema-preserved ensemble averaging system 100 has initiated method 200; (iii) it is currently a time at which method 200 is scheduled to be run; or (iv) method 200 should commence in response to occurrence of some other condition. In one embodiment, the computer is configured by computer-executable instructions to execute functions of extrema-preserved ensemble averaging system 100. Following initiation at start block 205, method 200 continues to process block 210.

At process block 210, the processor identifies locations and values of extrema in a training signal. In one embodiment, the processor examines the signal values of the training signal to determine which of the values is an extreme, and then records the signal value and the location or position within the training signal of the extreme. In one embodiment, the processor parses the training signal to find two extrema: the largest or maximum signal value in the training signal, and the least or minimum signal value in the training signal. Once an extreme is found, the processor may then record a value for the extreme, along with an index value indicating the placement of the extreme in the training signal.

In one embodiment, the extrema in a training signal are the maximum and minimum signal values within the training signal. In one embodiment, as used herein, the "location" of an extreme (or other value) within a signal refers to a time-stamp or temporal position at which the value occurred. In one embodiment, the location of an extreme (or other value) in the training signal may be referred to by an index such as a time stamp or an observation number (from which an approximate time stamp can be derived). In one embodiment, the value of an extreme (or other signal value) is an amplitude or other quantity representing a reading by a sensor of a physical phenomenon. In one embodiment, the training signal is a time series of readings describing the physical phenomenon. In one embodiment, the training signal is a time series signal belonging to a time series database of one or more time series signals. In one embodiment, the time series signal is a training set that includes fewer than all observations of a time series signal.

In one embodiment, the location of an extreme may be identified by parsing the values and indexes of observations in the training signal. In one embodiment, the processor compares the values of observations with each other (for example as described in more detail herein with regard to process blocks 335 and 340) to discover which has the maximum or greatest value, and which has the minimum or least value. The processor then stores the value and index (location within the training signal) of the maximum and the value and index (location within the training signal) of the minimum. The values and indexes of these extrema may be retrieved from storage for subsequent processing. The values of the extrema—the minimum value and the maximum value—are thus preserved. In one embodiment, values and indexes (locations) for extrema are identified for multiple training signals in a training database.

In one embodiment, the functions of process block 210 may be performed by extrema locator 105 or other components of system 100. Process block 210 completes, and method 200 continues at process block 215. At the completion of process block 210, the processor has identified the extrema in the training and recorded their respective values and locations within the training signal. The values and locations of the minimum and maximum are retained for subsequent re-insertion into an ensemble averaged signal, as described below.

At process block 215, the processor ensemble averages the training signal to produce an averaged training signal. In one embodiment, the processor subdivides the training signal into averaging windows, calculates the averages of the training signal values in the averaging windows, and creates the averaged training signal from the calculated averages. In one embodiment, the processor In one embodiment, the average is a mean of values. In one embodiment, the average is a median of values.

In one embodiment, ensemble averaging as used herein refers to generating a series of averages of values in successive, non-overlapping signal segments of constant length. In one embodiment, ensemble averaging as used herein is a form of moving average in which averaging windows do not overlap, and are contiguous. In one embodiment, the averages of training signal values within the averaging windows become the values of the averaged training signal. Thus, in one embodiment, the averaged training signal is a time series of averages of training signal values.

Averaging of signal values may cause extrema values to be eliminated. For example, averaging across an average window causes individual signal values within the window to be replaced by an average of the signal values within the window, thereby eliminating any extrema that occur within the window. Averaging eliminates the minimum value and maximum value in the averaged training signal due to the effect of averaging values in a window. Where a maximum is present in a window with other, lower signal values, the average value of the signal values within the window will be less than the maximum, thereby eliminating the maximum. Where a minimum is present in a window with other, higher signal values, the average value of the signal values within the window will be greater than the minimum, thereby eliminating the minimum. Thus, averaging causes extrema in a signal to be deleted, replaced, lost, or otherwise eliminated when producing an averaged signal from averages of signal values. To preserve these extrema from elimination due to averaging, the locations and values of the extrema may be stored or saved as data structures for placement back into the averaged signal. Thus, the averages of signal values fall between the extrema. In one embodiment, ensemble averaging as used herein refers to any algorithm that averages values of a signal which also causes extreme values to be eliminated due to the averaging.

In one embodiment, the processor parses the training signal to assign beginning and ending positions of averaging windows in the training signal. For example, the processor counts segments of the training signal that are the length of the averaging window (WS). The length of the averaging window WS may be expressed in a number of time steps or observations of a signal, such as the training signal. The processor then averages the values of the training signal that appear within an averaging window to produce an averaged value for the window. The averaged value is then stored in the averaged signal. In one embodiment, the averaged values are found and added into the averaged signal in order of index value of the training signal. In this manner, the processor may generate the averaged training signal as a data structure. For example, the averaged training signal is created as a time series signal with averaged values as its data points. The averaged values in the training signal may be indexed with time stamps or observation numbers corresponding to the averaging window from which the averaged value was generated.

In one embodiment, as a result of the ensemble averaging, observations in the training signal are condensed to fewer observations taken at a longer sampling interval in the averaged training signal. For example, the sampling interval in the averaged training signal is the length of the averaging windows. Thus, in one embodiment, the length of the averaged training signal ($L_A$) is the length of the of the training signal (L) divided by the size of the averaging window (WS).

In one embodiment, each value in the averaged training signal corresponds to an averaging window applied to the training signal. In one embodiment, a value in the averaged training signal is the average of the values of the training signal that occur within the averaging window. Thus, in one embodiment, the value in the averaged training signal that results from the averaging of the training values in the averaging window corresponds to the averaging window.

In one embodiment, the values of the averaged training signal share an order in common with the training signal. For example, a first averaged training signal value that averages a first WS training signal values is followed by a subsequent second averaged training signal value that averages the next WS training signal values following the first WS training signal values, and so on.

Figure 4:
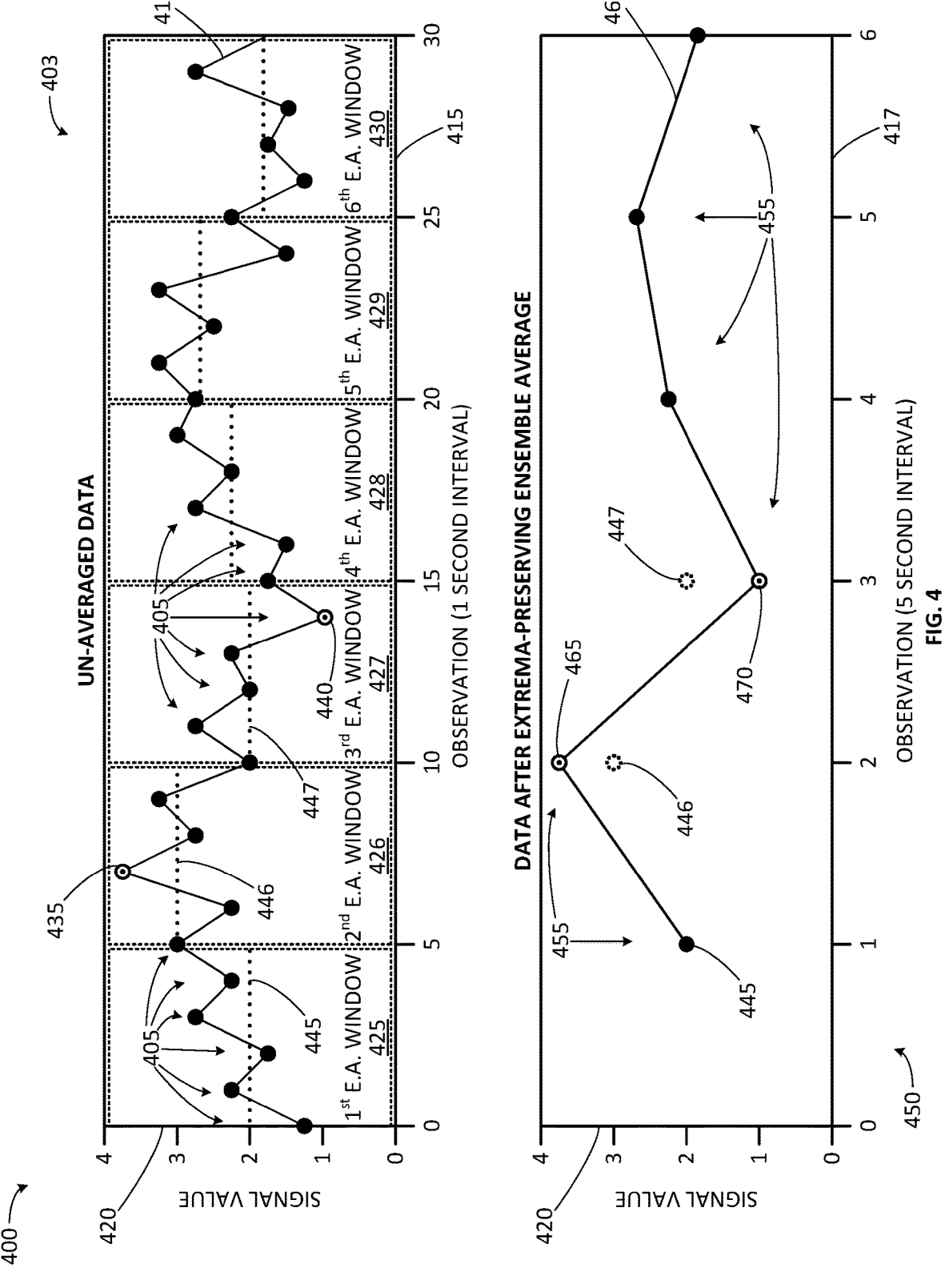
FIG. 4 illustrates a signal plot showing example application to a time series signal of one example method for extrema-preserved ensemble averaging.

One example of ensemble averaging is shown and described elsewhere herein with reference to FIG. 4. In one embodiment, the functions of process block 215 may be performed by ensemble averager 110 or other components of system 100. Process block 215 then completes, and method 200 continues at process block 220. In one embodiment, at the completion of process block 215, an ensemble averaged signal of averaged values has been created from the training signal. In one embodiment, the averaged values are averages of ranges of values (that is, averaging windows) in the training signal. The ensemble averaging filters or smooths noise within the training signal. The removal of noise enhances the precision of an ML model trained on the averaged training signal over an ML model trained on the training signal. The ensemble averaging also reduces the size of the training signal by the ratio of 1/WS. The reduced size of training signal reduces the memory footprint for training an ML model on the averaged training signal in comparison with training an ML model on the training signal.

At process block 220, the processor places the values of the extrema into the averaged training signal at respective locations of the extrema to produce an extrema-preserved averaged training signal. In one embodiment, the processor extracts the respective locations of the extrema. For example, the respective locations of the extrema are the location of the minimum value within the training signal, and the location of the maximum value within the training signal. In one embodiment, the processor extracts the respective values of the extrema. For example, the respective values of the extrema are the minimum value within the training signal and the maximum value within the training signal.

In this manner, the processor may generate the extrema-preserved averaged training signal as a data structure, such as a time series signal. The processor may generate the extrema-preserved averaged training signal by modifying the data structure for the averaged training signal. The processor may replace values in the averaged training signal with values of the extrema to convert the averaged training signal into the extrema-preserved averaged training signal. For example, the processor may locate a position in the data structure for the averaged training signal that corresponds to the location of the maximum, and replace an averaged value at the position with the value of the maximum. And, the processor may locate a position in the data structure for the averaged training signal that corresponds to the location of the minimum, and replace an averaged value at the position with the value of the minimum. By making these replacements, the processor may modify data structure for the averaged training signal into a data structure for the extrema-preserved averaged training signal.

In one embodiment, as the training signal is converted to the averaged training signal, the length of the signal changes from L to $L_A$, and observation numbers may change. For example, where the observation number of a minimum value in the training signal is #20, the observation number for the location of the minimum value could become #4 in an averaged training signal with a WS of 5. Therefore, in one embodiment, as discussed above, the locations of the extrema are temporal locations based on time-stamp. The time-stamp-based location of the extrema does not change temporal location between training signal and averaged training signal, even where observation index numbering and granularity do change. In one embodiment, the location may be an approximate temporal location in order to allow for the granularity of the signal. Thus, in one embodiment, location of an extreme remains temporally consistent within the training signal and averaged training signal, regardless of change in granularity or observation index numbering between the signals.

In one embodiment, the processor then determines an ensemble averaging window in which an extreme appears. For example, the processor may divide the location of the extreme by the window size (WS) and round up to the nearest whole number. The resulting number indicates the position of the averaging window in which the extreme appears. Because the positions of the ensemble averaging windows correspond to the positions of the averaged values for those windows within the averaged signal, the resulting number also indicates the index of an observation within the averaged signal that corresponds to the ensemble averaging window.

In one embodiment, the processor then substitutes the ensemble average value at the observation within the averaged signal that corresponds to the ensemble averaging window with the value of the extreme. In one embodiment, the processor identifies the index of the observation. In one embodiment, the processor then overwrites, replaces, or substitutes the average value of the observation at that index with the value of the extreme. Thus, in one embodiment, the value of the extreme is placed in the averaged training signal at the location that the extreme occupied in the training signal. Once extrema are returned to the averaged training signal, the averaged training signal, the averaged training signal becomes an extrema-preserved averaged training signal.

Thus, in one embodiment, the values of the extrema are re-placed or reinserted into the averaged signal at locations corresponding to their original locations within the training signal. In one embodiment, the locations correspond based on time-stamp. In one embodiment, the values of the extrema occupy the approximate temporal positions in the extrema-preserved averaged training signal as the extrema occupied in the training signal. One example of this replacement of extrema into the averaged training signal is shown and described elsewhere herein with reference to FIG. 4. In one embodiment, the functions of process block 220 may be performed by extrema replacer 115 or other components of system 100. Process block 220 then completes, and method 200 continues at process block 225.

In one embodiment, at the completion of process block 220, an extrema-preserved averaged training signal that retains the values of the extrema at their respective locations has been generated. This the extrema-preserved averaged training signal may then be used to train an ML model to detect anomalies. In one embodiment, an ML model trained on the extrema-preserved averaged training signal exhibits increased prognostic accuracy over that of an ML model trained on the averaged training signal or the raw training signal. For example, reinsertion or re-placement of the extrema in the signal used for training the ML model eliminates the possibility that values in a surveillance signal being monitored by the ML model will trigger false alerts by falling outside the range of values in the training signal used to train the ML model.

At process block 225, the processor trains a machine learning model with the extrema-preserved averaged training signal to detect anomalies in a signal. In one embodiment, the processor trains the ML model to predict values in the signal based at least in part on the extrema-preserved averaged training signal. In one embodiment, an anomaly is detected by deviation from the predicted values.

For general context, an ML model used for anomaly detection operates to estimate or predict an expected value for an individual time series signal based on input values of one or more other signals. The ML model may be trained to make accurate predictions of the expected value for the individual signal. A training time series database is provided as input to the ML model. The training time series database includes, as component time series signals, training portions of the individual signal and the one or more other signals.

The training process involves iteratively optimizing a configuration of the ML model until the ML model consistently predicts expected values for the training portion of the individual signal that match (within an acceptable tolerance) the actual values of the training portion of the individual signal. At the completion of training, the ML model may be used to monitor or surveil the individual time series signal for anomalies. A surveillance time series database including surveillance portions of the individual signal and the one or more other signals is provided as input to the ML model. The ML model predicts expected values for the surveillance portion of the individual signal based on the values of the surveillance portion of the one or more other signals. During monitoring, an expected value predicted by the ML model for the individual signal may be compared with an actual or observed value of the individual signal (for example, values received from a sensor). The difference between the actual value of the individual signal and the expected value of the individual signal predicted by the model may indicate an anomaly in the actual individual signal. Thus, an ML model may be trained to detect anomalies in the individual signal.

In one embodiment, the ML model is trained using the extrema-preserved averaged signal so that the ML model detects anomalies in another ensemble averaged signal with fewer false alerts. In one embodiment, the extrema-preserved averaged signal is included in a training database along with the other ensemble averaged signal that the ML model will be trained to detect anomalies in. The training database is provided as input to the ML model for training.

In one embodiment, the extrema-preserved averaged signal is one component signal of a training database that is provided as input for training the ML model. In the training database, the component signals other than the extrema-preserved averaged signal are also ensemble averaged as described above, using averaging window size WS. Also, one or more of the component signals other than the extrema-preserved averaged signal may also have its extrema preserved as described above. In one embodiment, each component signal of the training database is ensemble averaged using averaging window size WS, and retains extrema.

Once the training database is provided to the ML model, the ML model is then trained (in a manner similar to that discussed above for context) to detect anomalies in another ensemble averaged signal based on the extrema preserved averaged signal. Both the other ensemble averaged signal and the extrema preserved averaged signal are included in a training database provided to the ML model. In particular, the ML model is trained to predict expected values for the other averaged signal in the training database based on the values of the extrema preserved averaged signal in the database. For example, the configuration of the ML model is iteratively adjusted until the ML model predicts expected values for the other averaged signal that match the actual values of the other averaged signal. In this manner, the ML model is trained with an extrema preserved averaged signal in a signal database to detect anomalies in another individual signal of the signal database.

At the completion of training, the ML model may be used to detect anomalies in a surveillance portion of the other averaged signal where there is a difference between the expected and actual values for the ML model. Because the ML model is trained to detect anomalies using the extrema preserved averaged signal, which retains the maximum and minimum values of the training signal, the ML model detects anomalies in the other averaged signal with reduced false alarms. The false alarms are reduced because averaged values in an averaged signal that does not exhibit anomalies should generally fall between the minimum and maximum values of the training signal.

The trained ML model is then stored for subsequent use to monitor ensemble averaged signals, such as the other averaged signal for anomalies. For example, the ML model may monitor a surveillance portion of a signal database, of which the training database is also a portion. The surveillance portion of the signal database may include a surveillance portion of the other averaged signal, which may also be referred to herein as a surveillance signal.

In one embodiment, the functions of process block 225 may be performed by ML model trainer 120 or other components of system 100. Process block 225 then completes, and method 200 continues to END block 230, where method 200 completes. At the completion of method 200, an ML model has been trained to detect anomalous behavior in ensemble averaged signals. Use of extrema-preserved ensemble averaged training signals to train the ML model ensures that the ML model is trained to accommodate the widest amplitude range of signal values. In one embodiment, an ML model trained with extrema-preserved ensemble averaged training signals as described herein will produce few, if any, false alerts due to surveillance values beyond the training range. Thus, in one embodiment, reduction in memory footprint and processing burden is obtained from ensemble averaging of signals, while preservation of extrema prevents loss of AI prognostic accuracy that might otherwise occur due to the ensemble averaging.

In another embodiment of method 200, anomalies are detected in averaged signals based on an extrema-preserved averaged training signal. In one embodiment, process block 210 may include identifying locations and values of extrema in a training signal, and preserving the extrema values. The extrema values may be preserved, for example, by storing them as data structures in storage or memory.

In one embodiment, process block 215 may include averaging the training signal to produce an averaged training signal. The training signal may be averaged by selecting successive, non-overlapping signal segments of constant length. (The signal segments may also referred to as a "window," a "moving window," an "average window," or an "ensemble averaging window," as discussed in further detail below with reference to FIGS. 3 and 4). The average of the values in the signal segments may then be calculated. The averages of the values may then be placed as a data point into a time series signal data structure for the averaged training signal. The averages of the values are placed into the data structure at indexes corresponding to the training signal segments from which the averages are calculated. The averaged training signal is produced once the averages of the values are placed into the data structure for the averaged training signal. As discussed above in further detail with reference to process block 215, the averaging eliminates the extrema values from the averaged signal. The averages of signal values are between the extrema values.

In one embodiment, process block 220 may include generating an extrema-preserved averaged training signal by placing the preserved values of the extrema into the averaged training signal at respective locations of the extrema. For example, the processor may modify the data structure for the averaged training signal by replacing two of the averaged values with the preserved extrema values (the preserved minimum and maximum values). In particular, the averaged values at indexes corresponding to the training signal segments where the extrema occurred are replaced with the preserved values of the extrema.

In one embodiment, process block 225 may include detecting anomalies in other averaged signals based at least in part on the generated extrema-preserved averaged training signal. For example, the other averaged signal is a surveillance signal. The processor may train an ML model with the extrema-preserved averaged training signal, and use the trained ML model to predict or estimate values for the surveillance signal. Differences between predicted and actual values for the surveillance signal may indicate an anomaly in the surveillance signal. Because the predicted values for the surveillance signal are estimated by the ML model trained with the extrema-preserved averaged training signal, anomalies detected in the surveillance signal are detected based at least in part on the generated extrema-preserved averaged training signal.

In one embodiment, placing the values of the extrema into the averaged training signal at the respective locations of the extrema as discussed above with reference to process block 220 may further include determining an ensemble average window within which one of the extrema appears. The ensemble average window is a signal segment of the training signal for which the average of the signal values in the segment is calculated, as discussed below in further detail with reference to FIGS. 3 and 4. The average of the values in the ensemble average window is used to represent the values of the training signal in the averaged training signal. An extrema appears in the ensemble average window where the signal values within the ensemble averaging window include a minimum or maximum value of the training signal.

Once the ensemble averaging window in which the extrema appears is determined, an ensemble averaged value corresponding to the ensemble average window is substituted with the value of the one of the extrema. An ensemble averaged value "corresponds" to the ensemble average window by being a value in the averaged training signal resulting from averaging the values of the training signal within the ensemble average window, as discussed herein in further detail with reference to FIG. 4. This correspondence may also be based on temporal location (as discussed above) of the values within the ensemble average window and the temporal range of the ensemble average window. Thus positions within the averaged training signal are determined at which the values of extrema in the training signal are to be retained.

In one embodiment, placing the values of the minimum and maximum into the averaged training signal at the respective locations of the minimum and maximum as discussed above with reference to process block 220 may further include determining whether the minimum appears within a first ensemble average window. A first ensemble averaged value corresponding to the first ensemble average window in which the minimum appears is then substituted with the value of the minimum, causing the value of the minimum to replace the first ensemble averaged value in the averaged training signal. Whether the maximum appears within a second ensemble average window is also determined. A second ensemble averaged value corresponding to the second ensemble average window in which the maximum appears is then substituted with the value of the maximum, causing the value of the maximum to replace the second ensemble averaged value in the averaged training signal.

Figure 3:
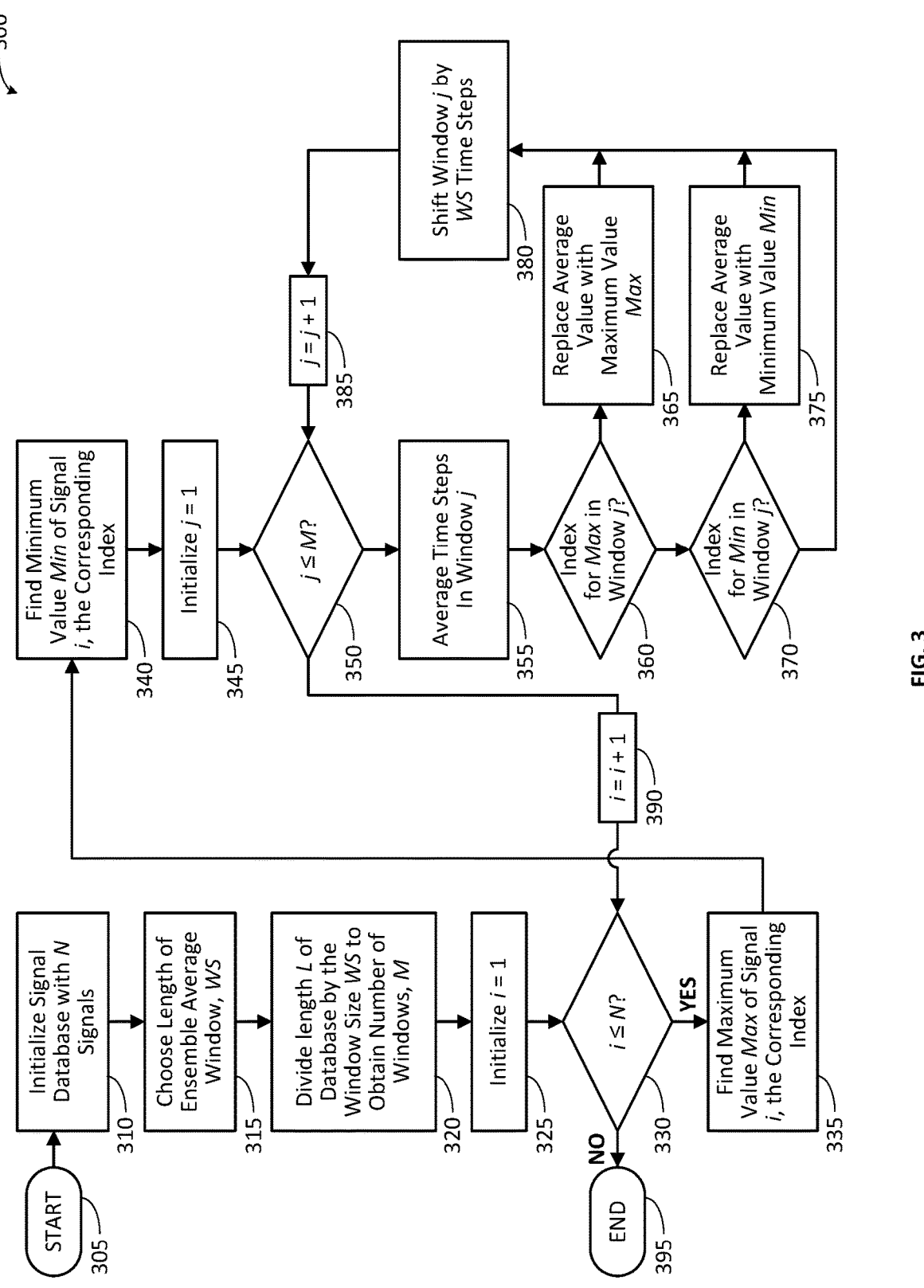
FIG. 3 illustrates another embodiment of an extrema-preserved ensemble averaging method associated with preserving signal extrema for ML model training when ensemble averaging time series signals for ML anomaly detection.

In one embodiment of process block 215, ensemble averaging the training signal may include selecting a length of an ensemble average window or window size (WS), for example as discussed herein with reference to process block 315 of FIG. 3. A number of the ensemble average windows (M) to cover the length of the training signal (L) is then determined, for example as discussed herein with reference to process block 320. For the number of ensemble average windows (M), the processor (i) averages the signal values within the ensemble average window to create an averaged signal value for example as discussed herein with reference to process blocks 215 and 355, (ii) appends the averaged signal value to the averaged training signal, and (iii) shifts the ensemble average window by the length of the ensemble average window, for example as discussed herein with reference to process block 380. Thus, in one embodiment, the processor adds a new ensemble-averaged signal value to the end of the average training signal for each ensemble average window position on the training signal. In one embodiment, as used herein, the term "append" refers to adding an item on to the end of an ordered data structure, for example adding an observation into a time series at an index or position subsequent to other observations(s) in the time series.

In one embodiment, method 200 may further include surveillance of other averaged signals with the trained machine learning model. As used herein, a surveillance signal is a signal that is to be monitored for anomalies. A surveillance signal that is to be monitored for anomalies by the trained machine learning model should first be ensemble averaged, for example in a manner similar to that described above for the training signal with reference to process block 215. Thus, a surveillance signal is ensemble averaged to produce an averaged surveillance signal. Extrema are not preserved or retained for the surveillance signal.

The processor then monitors the averaged surveillance signal for anomalies with the trained machine learning model. In one embodiment, the processor monitors the averaged surveillance signal for anomalies with the trained machine learning model by predicting values for the averaged surveillance signal and comparing the predicted values to actual values of the averaged surveillance signal. To monitor the averaged surveillance signal, the averaged surveillance signal is provided as an input signal to the trained ML model. The trained ML model is executed to predict or estimate values for the averaged surveillance signal, and calculates the residuals (the absolute value of the difference) between observed values for the averaged surveillance signal and ML model-estimated values for the averaged surveillance signal. Anomalies may be detected in the averaged surveillance signal where the residuals become large, as discussed below.

The absolute value of a difference between a predicted input signal value and an actual signal value is referred to as a residual. Analysis of the differences or residuals may indicate anomalous behavior exists in the averaged surveillance signal. In one embodiment, the processor executes a fault detection model such as the sequential probability ratio test (SPRT) to determine from the residuals whether behavior of the averaged surveillance signal is anomalous or not. In one embodiment, the processor detects an anomaly in the averaged surveillance signal. For example, the processor detects the anomaly because analysis of the residuals satisfies a threshold indicating the presence of an anomaly. Thus, the anomaly in the averaged signal is detected based on a difference between the predicted values and the actual values. Detection of the anomaly in the averaged surveillance signal indicates that an anomaly is present in the surveillance signal.

In one embodiment, in response to detecting the anomaly, an alert may be presented. In one embodiment, an electronic alert message indicating detection of anomalous behavior in the averaged surveillance signal is composed and transmitted. The alert message may be transmitted for display on a display device, or transmitted to other components of extrema-preserved ensemble averaging system 100 or of a broader time series data service in order to automatically initiate corrective actions.

In one embodiment, during the surveillance, the surveillance signal is received as a stream of surveillance data arriving from a sensor in a real-time flow. In one embodiment, while the surveillance signal arrives as a stream, the surveillance signal is ensemble averaged as the surveillance signal arrives. In one embodiment, as used herein, "real-time" refers to substantially real-time operation with availability of output subject to a delay between actions acceptable in context of the surveillance application.

In one embodiment, values of the training signal are parsed in a first pass to identify the locations and values of the extrema. Thus, in one embodiment, values of the training signal are parsed in the first pass to identify the location and value of the minimum and the location and value of the maximum, and preserve these locations and values. Values of the training signal are then parsed again in a second pass to ensemble average the training signal.

In one embodiment, the machine learning model is a multivariate machine learning model. In one embodiment, the machine learning model is a univariate machine learning model.

—Improved Performance with Extrema—Preserved Ensemble Averaging—

Computational challenges such as limits on processing power and memory footprint have become significant gating factors to streaming multivariate machine learning (ML) anomaly detection. For large scale streaming or batch ML anomaly detection use cases, sensor counts and sampling rates combine to overwhelm the capacity of cloud containers (configurations of CPUs, GPUs, and available RAM). Sensor counts and sensor sampling rates have both grown exponentially, causing the computational burden (shown by the number of sensors multiplied by the sampling rates) to be growing at a double exponential, substantially outpacing available CPU/GPU processing rates and memory capacities.

It has heretofore been the case for multivariate ML anomaly detection that it involves a tradeoff between computational burden and artificial intelligence (AI) performance: to achieve better AI performance involves a higher computational burden, and conversely reducing the computational burden reduces AI performance. In this case the "AI performance" encompasses such metrics as signal prediction accuracy, false-alarm probabilities (FAPs) (a measure of how likely a system is to generate an alarm when the alarm is unwarranted), missed-alarm probabilities (MAPs) (a measure of how likely a system is to fail to generate an alarm when the alarm is warranted), and time-to-detect (TTD) (a measure of the early warning time for detecting incipient anomalies).

In one embodiment, extrema-preserved ensemble averaging systems and methods described herein reduce, minimize, or even eliminate the tradeoff between AI performance and computational burden. In one embodiment, extrema-preserved ensemble averaging systems and methods as shown and described herein decreases the false alarm probability (FAP) without hindering the capacity for degradation detection all while decreasing the compute cost and memory footprint. In one embodiment, extrema-preserved ensemble averaging systems and methods described herein therefore reduce the computational burden of large scale streaming or batch ML anomaly detection without degradation in AI performance.

In one embodiment, the novel process explained herein cleverly processes adjacent time steps, not with naïve averaging of adjacent measured points, but with a novel "Extrema Preserving" double-pass data-flow framework. This new Extrema-Preserving Ensemble Averaging (EPEA) framework substantially reduces the memory footprint for ML training operations, and simultaneously reduces the compute cost (measured, for example, in processor cycles or operations) for multivariate ML anomaly detection. In one embodiment, compute cost is reduced linearly during surveillance or anomaly detection operations by application of extrema-preserved ensemble averaging systems and methods as shown and described herein. In one embodiment, compute cost is reduced supra-linearly during the more compute-intensive ML model training operations by application of extrema-preserved ensemble averaging systems and methods as shown and described herein. The has the effect of substantially increasing throughput and lowering latency for ML analyses.

Additionally, in one embodiment, the extrema-preserved ensemble averaging systems and methods as shown and described herein decrease false alarms and increase model accuracy by retaining the global extrema in ensemble-averaged data. The small statistical variations between the multivariate training and testing ranges are thereby eliminated, and the noise content of the data is thereby reduced.

In one embodiment, the extrema-preserved ensemble averaging systems and methods as shown and described herein require no hardware upgrades to compute or sensor hardware. Thus, in one embodiment, implementation of extrema-preserved ensemble averaging may be immediately backward compatible with existing data centers and sensor systems.

—Additional Example Extrema—Preserved Ensemble Averaging Method—

FIG. 3 illustrates another embodiment of an extrema-preserved ensemble averaging method 300 associated with preserving signal extrema for ML model training when ensemble averaging time series signals for ML anomaly detection. In one embodiment, method 300 shows a dual-pass extrema-preserving ensemble averaging algorithm. In one embodiment, in an initial processing pass through a training set of the example signal database, for each of N signals, the minimum and maximum are identified, and the index (time-stamp) for the minimum and maximum are stored along with the values of the minimum and maximum. In one embodiment, in a second processing pass through the example signal database, for each of the N signals, the entire training set is ensemble averaged. In one embodiment, the ensemble averaging is accomplished by deploying a moving window of size WS every WS adjacent time steps, and averaging the values appearing in the moving window. The moving window may also be referred to herein as a "window," an "averaging window," or an "ensemble averaging window". The window size WS may also be referred to a "length" of a window. The window size or window length may be expressed in a number of time steps or observations of a time series signal. The ensemble averaging procedure is modified so as to substitute in the maximum values for all N signals at the location where the maximum was identified in the first pass, and the minimum values for all N signals at the location where the minimum was identified in the first pass.

In one embodiment, extrema-preserved ensemble averaging method 300 initiates at start block 305 in response to a processor of a computer determining one or more of: (i) a training signal (e.g. training signal 125) or signal database including N training signals has been provided to extrema-preserved ensemble averaging system 100; (ii) a user or administrator of extrema-preserved ensemble averaging system 100 has initiated method 300; (iii) it is currently a time at which method 300 is scheduled to be run; or (iv) method 300 should commence in response to occurrence of some other condition. Following initiation at start block 305, method 300 continues to process block 310.

At process block 310, the processor initializes a signal database including N signals. In one embodiment, the signal database is initialized by retrieving the signal database from memory or storage and making the component signals of the database accessible for use by the processor. Method 300 then continues at process block 315.

At process block 315, the processor chooses a length of ensemble average window or window size WS. In one embodiment, the processor determines a window size based on a target maximum memory usage during ML model training. In one embodiment, the processor calculates a smallest window size that results in the maximum memory utilization during ML remaining below the target maximum. The target maximum may be pre-determined based on remaining within available memory capacity of cloud container(s) that is to execute the ML model training. In one embodiment, the processor accepts a user input of a window size. In one embodiment, the processor retrieves a pre-determined window size from memory or storage. Process block 315 then completes, and method 300 continues at process block 320.

At process block 320, the processor divides the length L of the signal database (for example, the length of the training set of the signal database) by the window size WS to obtain a number of windows M to cover the length L of the signal database. In one embodiment, the processor rounds the resulting number of windows M up to the next whole number, thereby disallowing partial windows. In one embodiment, partial windows are allowed. Process block 320 then completes, and method 300 continues at process block 325.

At process block 325, the processor initializes signal index i to an initial value of 1, and method 300 continues on to decision block 330. Decision block 330 is at the head of an outer while loop for processing each of N signals in a time series database. At decision block 330, the processor compares the value of signal index i to number of signals N to determine whether or not signal index i is less than or equal to (that is, not greater than) number of signals N. Where signal index i is less than or equal to number of signals N (330: YES), signals remain for processing, and method 300 continues at process block 335.

At process block 335, the processor finds the maximum value Max of signal i and the corresponding index for the maximum value. At process block 340, the processor finds the minimum value Min of signal i and the corresponding index for the minimum value. In one embodiment, process blocks 225 and 340 may be performed together in a single pass through signal i. In one embodiment, the functions of process blocks 335 and 340 are performed by extrema locator 105. In one embodiment, the processor initializes a value of maximum value Max to a value below the range of signal i, and initializes a value of minimum value Min to a value above the range of signal i. For each observation of signal i the processor compares the signal value v at the observation to the values of Max and Min. Where signal value v exceeds maximum value Max, the processor updates the value of maximum value Max to be signal value v, and records the index (e.g., time-stamp) of v to be the index of maximum value Max. Where signal value v is less than minimum value Min, the processor updates the value of minimum value Min to be signal value v, and records the index (e.g., time-stamp) of v to be the index of minimum value Min. In this way, once each observation of signal i has been thus processed, maximum value Max is the global maximum value of signal i, minimum value Min is the global minimum value of signal i, and the indexes of these values are recorded. Method 300 then continues at process block 345.

At process block 345, the processor initializes window index j to an initial value of 1, and method 300 continues on to decision block 350. Decision block 350 is at the head of an inner while loop for processing each of M windows covering a signal. At decision block 350, the processor compares the value of window index j to number of windows M to determine whether or not window index j is less than or equal to (that is, not greater than) number of windows M. Where window index j is less than or equal to number of windows M (block 350: YES), windows remain for processing, and method 300 continues at process block 355.

At process block 355, the processor averages the time steps (observations) in window j. In one embodiment, the functions of process block 355 are performed by ensemble averager 110. In one embodiment, the processor finds the mean value of all observations with indexes within window j. In one embodiment, the processor finds the median value of all observations with indexes within window j. In one embodiment, the window j is a contiguous block of observations between a first index, inclusive, and a second index, exclusive. In one embodiment, the lower end of the window j is inclusive of the observation at the lower end, and the upper end of the window j is exclusive of the observation at the upper end. In one embodiment, the lower end of the window j is exclusive of the observation at the lower end, and the upper end of the window j is inclusive of the observation at the upper end. Method 300 then continues at decision block 360.

At decision block 360, the processor determines whether the index for the maximum in signal N is within window j. For example, the processor determines the indexes of the observations that appear within window j. The processor then compares the indexes of the observations in window j to the index for the maximum in signal N. If a match is found, for example where the index of the maximum equals one of the indexes of the observations in window j, the index for the maximum is in window j (block 360: YES), and method 300 continues at process block 365. If no match is found, the index for the maximum is not in window j (block 360: NO), and method 300 continues at decision block 370.

At process block 365, the processor replaces the average value generated at process block 355 with the maximum value Max. In one embodiment, the processor overwrites the average value with the maximum value Max. In one embodiment, the functions of process blocks 360 and 365 are performed by extrema replacer 115. Method 300 then continues at process block 380.

At decision block 360, the processor determines whether the index for the minimum in signal N is within window j. For example, the processor determines the indexes of the observations that appear within window j. The processor then compares the indexes of the observations in window j to the index for the minimum in signal N. If a match is found, for example where the index of the minimum equals one of the indexes of the observations in window j, the index for the minimum is in window j (block 370: YES), and method 300 continues at process block 375. If no match is found, the index for the maximum is not in window j (block 370: NO), and method 300 continues at process block 380.

At process block 375, the processor replaces the average value generated at process block 355 with the minimum value Min. In one embodiment, the processor overwrites the average value with the minimum value Min. In one embodiment, the functions of process blocks 370 and 375 are performed by extrema replacer 115. Method 300 then continues at process block 380.

At process block 380, the processor shifts window j by WS time steps (or observations). In one embodiment, the processor advances window j by its length WS to cause it to encompass a next block of time steps (or observations). When shifting the window by the length of the window WS, the window positions do not overlap. Method 300 then continues at process block 385.

At process block 385, the processor increments the value of window index j by 1. This indicates that processing has moved on to the next ensemble averaging window. Method 300 then returns to decision block 350. Where window index j remains less than or equal to number of windows M (block 350: YES), windows remain for processing, and the inner loop iterates once more. Where window index j is no longer less than or equal to number of windows M (block 350: NO), no windows remain for processing, the inner loop terminates, and method 300 continues at process block 390.

At process block 390, the processor increments the value of signal index i by 1. This indicates that processing has ensemble averaged all windows of a signal, and moved on to the next signal in the signal database. Method 300 then returns to decision block 330. Where signal index i remains less than or equal to number of signals N (block 330: YES), signals remain for processing, and the outer loop iterates once more. Where signal index i is no longer less than or equal to number of signals N (block 330: NO), no signals remain for processing, and the outer loop terminates. Method 300 continues to END block 395, where processing completes.

—Example Effects of Extrema-Preserved Ensemble Averaging on Signal—

FIG. 4 illustrates a signal plot 400 showing example application to an example time series signal of one example method for extrema-preserved ensemble averaging. An upper subplot 403 of example raw, un-averaged signal data is compared with a lower subplot 450 of the example signal data after one embodiment of extrema-preserved ensemble averaging. Upper subplot 403 shows raw, un-averaged values 405 for an example time series signal 410. Un-averaged values 405 are plotted against an observation axis 415 and a signal value axis 420. Lower subplot 450 shows extrema-preserved ensemble averages 455 of un-averaged values 405 plotted against observation axis 417 and signal value axis 420.

Example time series signal is 30 observations in length (L=30). The observations of example time series signal 410 are subdivided into six (M=6) ensemble averaging windows: $1^{st}$ ensemble averaging window 425, $2^{nd}$ ensemble averaging window 426, $3^{rd}$ ensemble averaging window 427, $4^{th}$ ensemble averaging window 428, $5^{th}$ ensemble averaging window 429, and $6^{th}$ ensemble averaging window 430. The window size of ensemble averaging windows 425-430 is 5 (WS=5). Thus, the ensemble averaging windows include 5 observations. In this example, the ensemble averaging windows 425-430 are inclusive of the lower value of their range, and exclusive of the upper value of their range.

In one embodiment, extrema-preserved ensemble averages 455 make up the values of an example extrema-preserved ensemble averaged signal 460. Because extrema-preserved ensemble averaged signal 460 is made up of averages over ensemble averaging windows of length 5, example extrema-preserved ensemble averaged signal 460 has one observation for every 5 observations in example time series signal 410. Thus, in this example, ensemble averaged signal 460 will have a length of 6 observations ($L_A$=6). More generally, in one embodiment, an extrema-preserved ensemble averaged signal has one observation for every WS observations in a raw, un-averaged time series signal. In one embodiment, the observations of an extrema-preserved ensemble averaged signal correspond to the ensemble averaging windows for the raw, un-averaged time series signal. In one embodiment, the order of the observations in an extrema-preserved ensemble averaged signal is the order of the ensemble averaging windows for the raw, un-averaged time series signal.

The maximum 435 of example time series signal 410 has a value of 3.75 and occurs at observation 7. The minimum 440 of example time series signal 410 has a value of 1 and occurs at observation 14. As discussed above, the average of the raw signal values within an ensemble average window becomes the value corresponding to the ensemble average window in the extrema-preserved ensemble averaged signal, unless an extreme (maximum or minimum) occurs within the ensemble average window. Where an extreme occurs within an ensemble average window, the value of the extreme becomes the value corresponding to the ensemble average window in the extrema-preserved ensemble averaged signal.

Thus, in one embodiment, the mean of an ensemble average window is placed into the extrema-preserved ensemble averaged signal where no extrema occur within the ensemble average window. For example, the mean of the un-averaged values 405 in values in $1^{st}$ ensemble averaging window 425 ($1^{st}$ window mean 445) is 2. Because neither the maximum 435 nor the minimum 440 occurs within $1^{st}$ ensemble averaging window 425, $1^{st}$ window mean 445 is placed into example extrema-preserved ensemble averaged signal 460 at a position corresponding to $1^{st}$ ensemble averaging window 425.

In one embodiment, the maximum of the time series signal is placed into the extrema-preserved ensemble averaged signal where the maximum occurs within the ensemble average window. For example, the mean of the un-averaged values 405 in values in $2^{nd}$ ensemble averaging window 426 ($2^{nd}$ window mean 446) is 3. Because the maximum 435 occurs at observation 7, within $2^{nd}$ ensemble averaging window 426, $2^{nd}$ window mean 446 is replaced by the value (3.75) of maximum 435, as shown at maximum 465. The value of maximum 435 is placed into example extrema-preserved ensemble averaged signal 460 at a position corresponding to $2^{nd}$ ensemble averaging window 426. Thus, in one embodiment, maximum 465 is placed into ensemble averaged signal 460 at a temporal position that corresponds in time to the temporal position of maximum 435 in example time series signal 410. In other words, in one embodiment, the value of the maximum is placed into the averaged training signal at the location of the maximum in the training signal.

In one embodiment, the minimum of the time series signal is placed into the extrema-preserved ensemble averaged signal where the minimum occurs within the ensemble average window. For example, the mean of the un-averaged values 405 in values in $3^{rd}$ ensemble averaging window 427 ($3^{rd}$ window mean 447) is 2. Because the minimum 440 occurs at observation 14, within $3^{rd}$ ensemble averaging window 427, $3^{rd}$ window mean 447 is replaced by the value (1) of minimum 440, as shown at minimum 470. The value of minimum 440 is placed into example extrema-preserved ensemble averaged signal 460 at a position corresponding to $3^{rd}$ ensemble averaging window 427. Thus, in one embodiment, minimum 470 is placed into ensemble averaged signal 460 at a temporal position that corresponds in time to the temporal position of minimum 440 in example time series 410. In other words, in one embodiment, the value of the minimum is placed into the averaged training signal at the location of the minimum in the training signal.

—Example Test Data—

To illustrate the extrema-preserved ensemble averaging systems and methods as shown and described herein, an example time series database including 20 example time series signals is generated. In this example, the example time series signals are synthesized. In this example, an initial step of the synthesis is to generate 20 distinct composites of 3 sine waves with periodicities of 199, 383, and 547. These periodicities provide a known (ground truth) correlation and patterns in the individual time series signal. In one example, the 20 example time series signals of the example time series database are synthesized to represent correct behavior of an example device. Therefore the 20 example time series signals are known to not represent anomalous activity or degradation. Random measurement noise is then superimposed on the individual composite signals to produce the example time series signals. The random measurement noise causes the example time series signals to behave very similarly to actual sensor signals. The noise ratio (NR) as referred to herein indicates the standard deviation of the added Gaussian noise. In the example time series signals, the NR is 1.5. The example time series database (and the individual example time series signals therein) is synthesized to have 5000 observations, sampled at once per second. Thus, the example time series signals contain 5000 observations incremented at a time step of 1 second.

Figure 5:
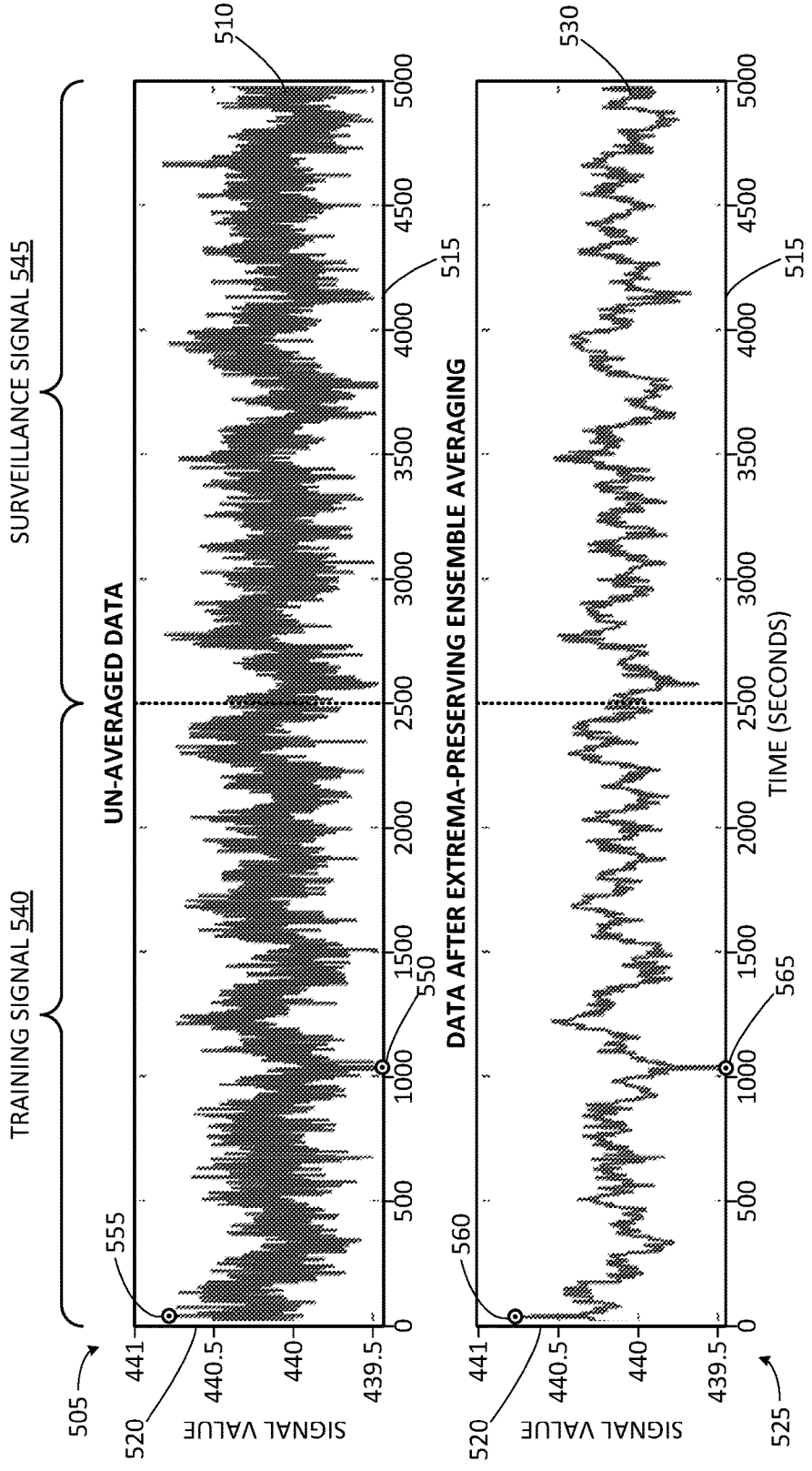
FIG. 5 illustrates a signal plot comparing an example time series signal before and after application of one embodiment of extrema-preserved ensemble averaging.

FIG. 5 illustrates a signal plot 500 showing an example time series signal from the above example time series database. Signal plot 500 presents a comparison of the example time series signal before and after application of one embodiment of extrema-preserved ensemble averaging. Top subplot 505 shows the raw, un-averaged signal data 510 plotted against a time axis 515 and a signal value axis 520. Raw, un-averaged signal data 510 retains the original, fine-grained detail of the example time series signal. Bottom subplot 525 shows the averaged signal data 530 after application of extrema-preserving ensemble averaging plotted against time axis 515 and signal value axis 520. Averaged signal data 530 shows the reduced noise, coarser-grained signal resulting from extrema-preserving ensemble averaging.

One portion of the observations in a time series signal may be designated to be a training signal. The training signal is used to train a ML model to predict or estimate behavior of component time series signal(s) of the time series signal database. For example, signal plot 500 shows a training signal 540 for raw, un-averaged signal data 510 and averaged signal data 530. In this example, the first half of the signal data is used as training signal 540.

Another portion of the observations in the time series signal may be designated a surveillance signal and analyzed with the trained ML model to generate predicted or esti-mated signal values for component time series signal(s) of the time series signal database. For example, signal plot 500 shows a surveillance signal 545 for raw, un-averaged signal data 510 and averaged signal data 530. In this example, the second half of the signal data is used as surveillance signal 545.

In one embodiment, as discussed above, the minimum value 550 in the training signal 540 and the maximum value 555 in the training signal 540 are identified in the fine-grained, un-averaged signal data 510. In bottom subplot 525, observe that most of the averaged signal data 530 has a lower noise level than un-averaged signal data 510. This is due to the ensemble averaging filter. But, in training signal 540, the fine-grained extrema remain: the maximum in training signal 540 is retained in averaged signal data 530 at maximum point 560, and the minimum in training signal 540 is retained in averaged signal data 530 at minimum point 565.

—Experimental Validation of Improvements—

In one embodiment, the extrema are preserved for the training signal portion of a time series signal database, and are not preserved for the surveillance signal portion of the time series database. In one embodiment, the surveillance set of the time series database is ensemble averaged without retaining the extrema. Thus, no extrema are retained in the surveillance signal 545 of averaged signal data 530.

A set of baseline results was established. The 20 example time series signals were used to generate a multivariate state estimation technique (MSET) model. The model was trained on the first half of the data (first 2500 seconds) and then deployed to monitor the second half of the data ($2501^{st}$ second to $5000^{th}$ second).

A second set of results applying one embodiment of the extrema-preserved ensemble averaging systems and methods to the example time series database of 20 example time series signals was also obtained for validation of the improvements. The 20 example time series signals were used to generate an MSET model after first being subjected to extrema-preserved ensemble averaging. In this example case, 5 is selected as the window size (WS). After the extrema-preserved ensemble averaging process, the 20 example time series signals now have signals with a 5 second sampling interval, thereby reducing the observations from 5000 total to 1000 total. The MSET model was trained on the first half of the data (the first 500 observations covering the first 2500 seconds) and then deployed to monitor the second half of the data (the $501^{st}$ observation to $1000^{th}$ observation, covering the $2501^{st}$ second to $5000^{th}$ second).

Comparison of the results reveals that, in one embodiment, the memory footprint and compute cost for training the MSET model and for surveillance is reduced by extrema-preserved ensemble averaging systems and methods. This reduction in memory footprint and compute cost is due to reducing the number of observations in the example time series database.

Comparison of the results also reveals an additional benefit: in one embodiment, extrema-preserved ensemble averaging systems and methods significantly reduce the false alarm probability (FAP). Where the MSET model is trained on the raw signals of the example time series database, and monitors the raw signals of the example time series database, several sequential probability ratio test (SPRT) alerts occur. Because the raw signals are known, as a ground truth, to represent correct behavior and not represent anomalous activity, these SPRT alerts are false alarms. But, in one embodiment, where the MSET model is trained on the extrema-preserved ensemble averaged signals, and monitors the ensemble averaged signals, the SPRT alert count, and thereby the FAP, drops down close to zero.

The following metrics summarize the results for the example time series database. The metrics tracked allow a reasonable comparison of performance between a model trained on and surveilling raw signals and a model trained on and surveilling extrema-preserved ensemble averaged signals. The alerts and empirical FAP were tracked to compare the prognostic performance of the models, while the kurtosis, skewness, and mean of residuals between signal values and model-predicted values were tracked as a proxy for precision.

As discussed above, the signals of the time series database do not include any anomaly or degradation, and the noise ratio is 1.5. For a convenient snapshot view of the results, the metrics are averages across all 20 signals in the example time series database. For the MSET model that utilized the unaltered (raw signal) data set, the average alarm count is 7.8 alarms, the average empirical FAP is 0.0031, the average kurtosis is 6.09, the average absolute skewness is 0.290, and the average absolute mean is 0.061. For the MSET model that utilized an example extrema-preserved ensemble averaged data set, the average alarm count is 1.0, the average empirical FAP is 0.0020, the average kurtosis is 4.10, the average absolute skewness is 0.235, and the average absolute mean is 0.050.

The results for the MSET model that utilized the example extrema-preserved ensemble averaged data set show marked improvement in the average alert count, in addition to an approximately 33% improvement in the average empirical FAP, and kurtosis of the residuals. The gains in performance for the example extrema-preserved ensemble average processed signals in the remaining metrics—skewness and bias in the residuals—are smaller but still meaningful. No metrics reflecting the effectiveness of anomaly detection deteriorated from using data processed in accordance with one embodiment of extrema-preserved ensemble averaging as described herein. Instead, all metrics improved. Thus, in one embodiment, both prognostic performance and precision of ML anomaly detection are improved by implementation of extrema-preserved ensemble averaging as described herein.

Further analysis ascertains how the different training schemes effect MSET and its capacity for degradation detection. An analysis was performed to evaluate the effect of extrema-preserved ensemble averaging systems and method on detection of anomalies. The effect is illustrated by injecting a synthetic fault into one or more of the time series signals of the example database. This technique demonstrates anomaly detection effectiveness because when a fault is injected into databases of test signals, there is ground truth knowledge of the presence of the fault with which to quantify the Missed Alarm Probability (MAP).

To simulate a slow drift in the signal, a subtle ramp was injected into the example time series signal. The ramp simulates a common sensor degradation mode known as linear de-calibration bias. The ramp begins at time step 3750 of the example time series signal and terminates at time step 5000. The simulated degradation is therefore entirely within the surveillance portion of the signal. After the degradation was inserted into the signal database, an MSET model was trained on the first half of the raw signals and then used to surveil the second half of the raw signals. Also, after the degradation was inserted into the signal database, an MSET model was trained on extrema-preserved ensemble averages of the first half of the signals, and then used to surveil ensemble averages of the second half of the signals.

The following metrics summarize the results for the example time series database. One metric that is useful for determining the performance degradation detection is the time to detect (TTD). Another metric, alarm density, is a proxy for the uncertainty in detecting an anomaly. Comparing the TTD of the two models shows that the MSET model generated by the unaltered data is marginally better than the MSET model generated by the extrema-preserved ensemble averaging processed data. (This is due to the very slight delay introduced by the averaged value for an ensemble averaging window remaining incomplete until all values in the ensemble are available.) But, more importantly, the uncertainty in detecting an anomaly is significantly reduced in the ensemble average results as evidenced by a higher alert density approximately beginning at observation 900 (which after the extrema-preserved ensemble averaging procedure is approximately 4500 secs into the dataset).

It is clear that, in one embodiment, the extrema-preserved ensemble averaging method decreases FAP, increases model precision, and reduces detection uncertainty all while only marginally altering the time to detection. These improvements are a direct consequence of combining extrema preservation and the ensemble averaging of adjacent time steps.

The extrema preservation reduces false alarms caused by statistical noise variations between training range and the testing range of signal values. Where raw signal data is used, the training measurements could encompass all the relevant modes of operation to produce quality estimates inside a reasonable range of a device, but, as a result of noise on the signal, the test range could still exceed the training range boundaries. In this instance it is likely that a false alarm will be triggered. But, by preserving the global extrema of the signals during training, the possibility that test range will exceed the training range and instigate a false alarm is eliminated.

A second reason for the decreased FAP is a product of the ensemble averaging. By averaging adjacent values, the resulting signals exhibit an increased signal to noise ratio without altering the time dependency of the measurements. Moreover, as mentioned previously, the ensemble averaging also decreases the sample rate, which drives down the memory consumption and compute cost of ML analyses.

The decrease in both memory usage and compute cost realized by one embodiment of extrema-preserved ensemble averaging was validated experimentally. A first experiment tracked the maximum memory usage during the training phase of MSET as the window size WS of ensemble average window increases. Memory consumption was shown to monotonically decrease as the ensemble average window size increases. This demonstrates that memory consumption will always decrease as the ensemble average window increases. Furthermore, the reduction in the memory footprint decreases cubically, so the gains from utilizing the extrema-preserved ensemble averaging are quickly realized.

A second experiment tracked time to task completion during the training phase of MSET as the window size WS of ensemble average window increases. Time to task completion is representative of the compute cost. Time to task completion—and therefore, compute cost—was shown to supra-linearly decrease as the ensemble average window size increases.

The improvements discussed herein were realized using equivalent (or the same) benchmark computer configurations, without change to hardware. Thus, both the computer performance and ML anomaly detection are improved by the systems and methods described herein. These improvements are not caused by brute force application of computing power, but by the inventive systems and methods shown herein for extrema-preserved ensemble averaging.

MSET is used herein as an example ML anomaly detection model for illustrative purposes. In one embodiment, the extrema-preserved ensemble averaging systems and methods as shown and described herein similarly improve non-linear non-parametric (NLNP) regression algorithms used for multivariate anomaly detection. Such NLNP regression algorithms include neural networks (NNs), Support Vector Machines (SVMs), autoassociative kernel regression (AAKR), and similarity-based modeling (SBM) such as the multivariate state estimation technique (MSET) (including Oracle's proprietary Multivariate State Estimation Technique (MSET2)).

—Cloud or Enterprise Embodiments—

In one embodiment, the present system (such as extrema-preserved ensemble averaging system 100) is a computing/data processing system including a computing application or collection of distributed computing applications for access and use by other client computing devices that communicate with the present system over a network. In one embodiment, extrema-preserved ensemble averaging system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment extrema-preserved ensemble averaging system 100 is a centralized server-side application that provides at least the functions disclosed herein and that is accessed by many users via computing devices/terminals communicating with the computers of extrema-preserved ensemble averaging system 100 (functioning as one or more servers) over a computer network.

In one embodiment, the components of extrema-preserved ensemble averaging system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of system 100 may (i) generate or compose an electronic message or signal to issue a command or request to another component, (ii) transmit the message or signal to other components of computing system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by extrema-preserved ensemble averaging system 100, for example through a web interface server. In one embodiment, the remote computing system may send requests to and receive responses from extrema-preserved ensemble averaging system 100. In one example, access to the information or applications may be effected through use of a web browser on a personal computer or mobile device. In one example, communications exchanged with extrema-preserved ensemble averaging system 100 may take the form of remote representational state transfer (REST) requests using JavaScript object notation (JSON) as the data interchange format for example, or simple object access protocol (SOAP) requests to and from XML servers. The REST or SOAP requests may include API calls to components of extrema-preserved ensemble averaging system 100.

—Computing Device Embodiment—

Figure 6:
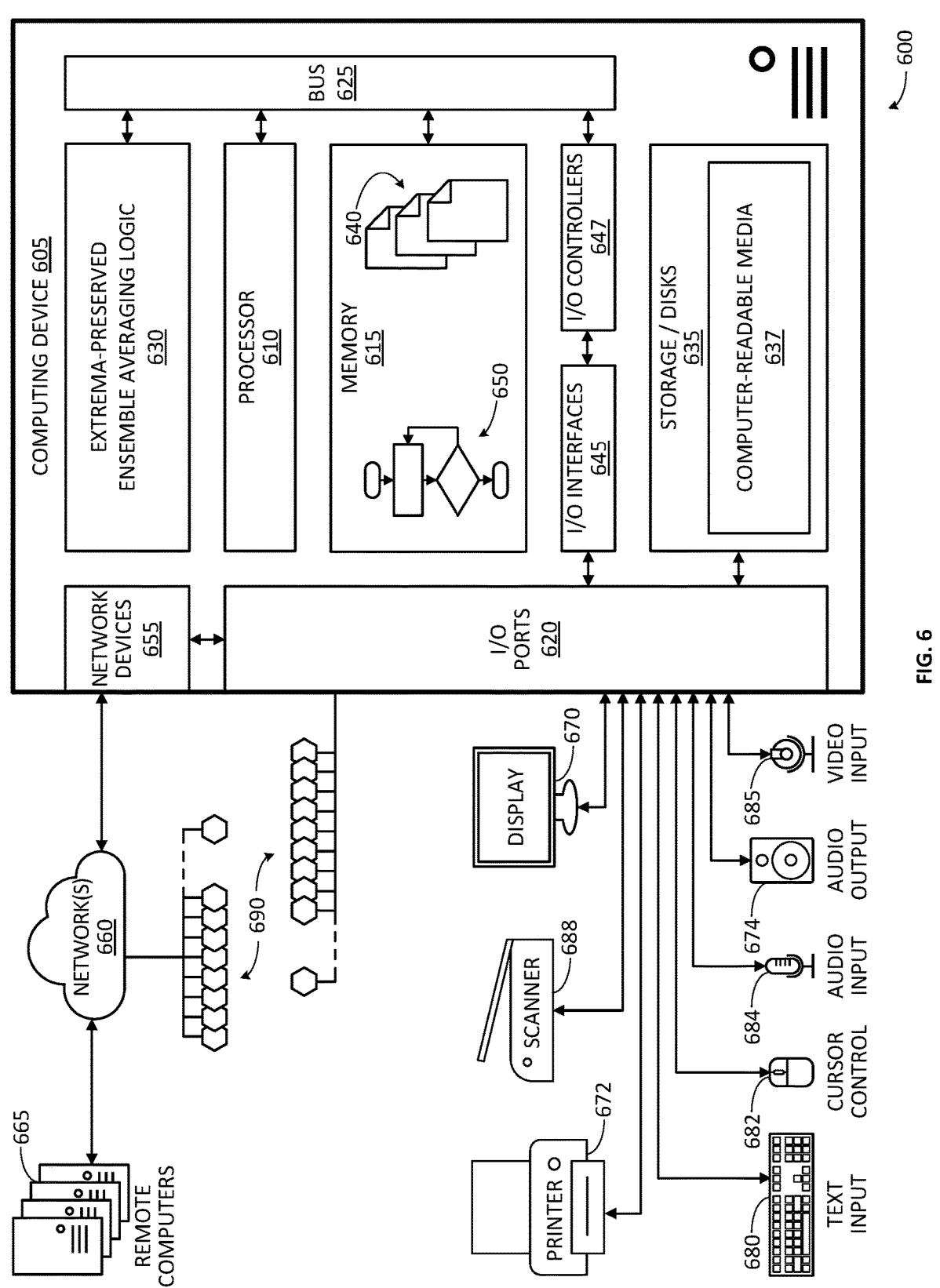
FIG. 6 illustrates an embodiment of a computing system configured with the example systems and/or methods disclosed.

FIG. 6 illustrates an example computing system 600 that is configured and/or programmed as a special purpose computing device with one or more of the example systems and methods described herein, and/or equivalents. In one embodiment, example computing system 600 includes an example computer or computing device 605. Example computing device 605 may include at least one hardware processor 610, a memory 615, and input/output ports 620 operably connected by a bus 625. In one example, the computer 605 may include extrema-preserved ensemble averaging logic 630 configured to facilitate preserving signal extrema for ML model training when ensemble averaging time series signals for ML anomaly detection, similar to the logic, systems, and methods shown and described with reference to FIGS. 1-5.

In different examples, logic 630 may be implemented in hardware, a non-transitory computer-readable medium 637 with stored instructions, firmware, and/or combinations thereof. While logic 630 is illustrated as a hardware component attached to the bus 625, it is to be appreciated that in other embodiments, logic 630 could be implemented in the processor 610, stored in memory 615, or stored in disk 635.

In one embodiment, logic 630 or the computer is a means (that is, structure: hardware, non-transitory computer-readable medium, firmware) for performing the actions described. In some embodiments, computing device 605 may be a server operating in a cloud computing system, a server configured in a Software as a Service (SaaS) architecture, a smart phone, laptop, tablet computing device, and so on.

The means may be implemented, for example, as an ASIC programmed to facilitate preserving signal extrema for ML model training when ensemble averaging time series signals for ML anomaly detection. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for preserving signal extrema for ML model training when ensemble averaging time series signals for ML anomaly detection.

Generally describing an example configuration of the computer 605, the processor 610 may be a variety of various processors including dual microprocessor and other multi-processor architectures. A memory 615 may include volatile memory and/or non-volatile memory. Non-volatile memory may include, for example, ROM, PROM, and so on. Volatile memory may include, for example, RAM, SRAM, DRAM, and so on.

Storage or disks 635 may be operably connected to the computer 605 via, for example, an input/output (I/O) interface (e.g., card, device) 645 and an input/output port 620 that are controlled by at least an input/output (I/O) controller

647. The storage or disk 635 may be, for example, a magnetic disk drive, a solid state drive, a floppy disk drive, a tape drive, a Zip drive, a flash memory card, a memory stick, and so on. Furthermore, the storage or disk 635 may be a CD-ROM drive, a CD-R drive, a CD-RW drive, a DVD ROM, and so on. The memory 615 can store a process 650 (such as method 200) and/or a data 640, for example. The storage or disk 635 and/or the memory 615 can store an operating system that controls and allocates resources of the computer 605.

The computer 605 may interact with, control, and/or be controlled by input/output (I/O) devices via the input/output (I/O) controller 647, the I/O interfaces 645, and the input/output ports 620. Input/output devices may include, for example, one or more displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 635, network devices 660, and so on. The input/output ports 620 may include, for example, serial ports, parallel ports, and USB ports.

The computer 605 can operate in a network environment and thus may be connected to the network devices 655 via the I/O interfaces 645, and/or the i/O ports 620. Through the network devices 655, the computer 605 may interact with a network(s) 660. Through network 660, the computer 605 may be logically connected to remote computers 665. Networks with which the computer 605 may interact include, but are not limited to, a LAN, a WAN, and other networks.

In one embodiment, the computer may be connected to sensors 690 through 1/O ports 620 or networks 660 in order to receive information about physical states of monitored machines, devices, systems, or facilities (which may be collectively referred to as "assets"). In one embodiment, sensors 690 are configured to monitor physical phenomena occurring in or around an asset. The assets generally include any type of machinery or facility with components that perform measurable activities. In one embodiment, sensors 690 may be operably connected or affixed to assets or otherwise configured to detect and monitor physical phenomena occurring in or around the asset. The sensors 690 may be network-connected sensors for monitoring any type of physical phenomena. The network connection of the sensors 690 and networks 660 may be wired or wireless. The sensors 690 may include (but are not limited to): a voltage sensor, a current sensor, a temperature sensor, a pressure sensor, a scale or other weight sensor, a rotational speed sensor, an angle sensor, a distance sensor, a displacement sensor, a thermometer, a flow meter sensor, a vibration sensor, a microphone, a photosensor, an electromagnetic radiation sensor, a proximity sensor, an occupancy sensor, a motion sensor, a gyroscope, an inclinometer, an accelerometer, a shock sensor, a global positioning system (GPS) sensor, a torque sensor, a flex sensor, a moisture monitor, a liquid level sensor, an electronic nose, a nuclear radiation detector, or any of a wide variety of other sensors or transducers for generating telemetry-electrical signals that describe detected or sensed physical behavior.

In one embodiment, computer 605 is configured with logic, such as software modules, to collect readings from sensors 690 and store them as observations in a time series data structure such as a time series database. In one embodiment, the computer 605 polls sensors 690 to retrieve sensor telemetry readings. In one embodiment, the computer 690 passively receives sensor telemetry readings actively transmitted by sensors 690. In one embodiment, the computer 605 receives one or more databases of previously collected observations of sensors 690, for example from storage 635 or from remote computers 665.

Definitions and Other Embodiments

No action or function described or claimed herein is performed by the human mind. An interpretation that any action or function can be performed in the human mind is inconsistent with and contrary to this disclosure.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

In one embodiment, each step of computer-implemented methods described herein may be performed by a processor of one or more computing devices (i) accessing memory and (ii) configured with logic to cause the system to execute the step of the method. For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device.

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/ components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
   storing, in a data structure, locations and values of extrema of a training signal, wherein the extrema are a largest signal value in the training signal and a least signal value in the training signal;
   ensemble averaging the training signal to produce an averaged training signal, wherein the extrema are eliminated in the averaged training signal by the ensemble averaging;

placing the values of the extrema back into the averaged training signal at respective locations of the extrema by overwriting averaged values at the respective locations with the respective stored values of the extrema to produce an extrema-preserved averaged training signal; and training a machine learning model to detect anomalies in a signal without false alarms for values between the extrema and outside a range of the averaged training signal using the extrema-preserved averaged training signal.

2. The computer-implemented method of claim 1, wherein placing the values of the extrema into the averaged training signal at the respective locations of the extrema further comprises:

determining an ensemble average window within which one of the extrema appears; and substituting an ensemble averaged value corresponding to the ensemble average window with the value of the one of the extrema.

3. The computer-implemented method of claim 1, wherein the ensemble averaging the training signal further comprises:

selecting a length of an ensemble average window;

determining a number of the ensemble average windows to cover the length of the training signal; and for the number of ensemble average windows, averaging the signal values within the ensemble average window to create an averaged signal value, appending the averaged signal value to the averaged training signal, and shifting the ensemble average window by the length of the ensemble average window.

4. The computer-implemented method of claim 1, further comprising:

ensemble averaging a surveillance signal to produce an averaged surveillance signal; and monitoring the averaged surveillance signal for anomalies with the trained machine learning model.

5. The computer-implemented method of claim 4, further comprising receiving the surveillance signal as a stream of surveillance data arriving from a sensor in a real-time flow, wherein the surveillance signal is ensemble averaged as the surveillance signal arrives.

6. The computer-implemented method of claim 1, further comprising:

parsing values of the training signal in a first pass to identify the locations and values of the extrema; and parsing values of the training signal in a second pass to ensemble average the training signal.

7. The computer-implemented method of claim 1, wherein the machine learning model is a multivariate machine learning model.

8. A non-transitory computer-readable medium that includes stored thereon computer-executable instructions that when executed by at least a processor of a computer cause the computer to:

identify a location and value of one minimum for a training signal and a location and value of one maximum for the training signal, and preserve the minimum value and the maximum value in a storage data structure;

ensemble average the training signal in the training set to produce an averaged training signal, wherein the ensemble averaging eliminates the minimum value and maximum value in the averaged training signal;

place the minimum value back into the averaged training signal by overwriting a first averaged value at the location of the minimum with the minimum value and place the maximum value back into the averaged training signal by overwriting a second averaged value at the location of the maximum with the maximum value to produce an extrema-preserved averaged training signal; and train a machine learning model to detect anomalies in a signal accurately for values that approach the extrema using with the extrema-preserved averaged training signal.

9. The non-transitory computer-readable medium of claim 8, wherein the instructions to place the value of the minimum into the averaged training signal at the location of the minimum and place the value of the maximum into the averaged signal at the location of the maximum further cause the computer to:

determine whether the minimum appears within a first ensemble average window;

substitute a first ensemble averaged value corresponding to the first ensemble average window in which the minimum appears with the value of the minimum;

determine whether the maximum appears within a second ensemble average window; and substitute a second ensemble averaged value corresponding to the second ensemble average window in which the maximum appears with the value of the maximum.

10. The non-transitory computer-readable medium of claim 8, wherein the instructions to ensemble average the signal further cause the computer to:

select a length of an ensemble average window; and for a number of ensemble average windows of the length that covers the training signal, average the values of the training signal within the window to create an averaged signal value, append the averaged signal value to the averaged training signal, and shift the window by the length.

11. The non-transitory computer-readable medium of claim 8, wherein the instructions further cause the computer to:

ensemble average a surveillance signal to produce an averaged surveillance signal; and monitor the averaged surveillance signal for anomalies with the trained machine learning model.

12. The non-transitory computer-readable medium of claim 11, wherein the instructions further cause the computer to receive the surveillance signal as a stream of surveillance data arriving from a sensor in a real-time flow, wherein the surveillance signal is ensemble averaged as the surveillance signal arrives.

13. The non-transitory computer-readable medium of claim 8, wherein the instructions further cause the computer to:

parse values of the training signal in a first pass to identify the location and value of the minimum and the location and value of the maximum; and parse values of the training signal in a second pass to ensemble average the training signal.

14. The non-transitory computer-readable medium of claim 8, wherein the machine learning model is a multivariate state estimation technique model.

15. A computing system, comprising:

at least one processor;

at least one memory operably connected to the processor; and a non-transitory computer readable medium including instructions stored thereon that when executed by at least the processor cause the computing system to:

identify locations and values of extrema in a training signal, and preserve the extrema values in a storage data structure, wherein the extrema are one maximum over the entire training signal and one minimum over the entire training signal;

average the training signal to produce an averaged training signal, wherein the averaging eliminates the extrema values in the averaged training signal;

generate an extrema-preserved averaged training signal by placing the preserved values of the extrema back into the averaged training signal at respective locations of the extrema by replacing averaged values at the respective locations with the respective extrema values from the storage data structure;

train a machine learning model to detect anomalies in a signal accurately for values that approach the extrema using the extrema-preserved averaged training signal; and detect anomalies in other averaged signals using the trained machine learning model.

16. The computing system of claim 15, wherein the instructions to place the values of the extrema into the averaged training signal at respective locations of the extrema further cause the computing system to:

determine whether one extreme of the extrema appears within an average window;

substitute an ensemble averaged value for the average window in which the extreme appears with the value of the one extreme.

17. The computing system of claim 15, wherein the instructions to average the training signal further cause the computing system to:

select a length of an average window;

average the values of the training signal within the average window to create an averaged signal value;

append the averaged signal value to the averaged training signal; and shift the average window by the length.

18. The computing system of claim 15, wherein the instructions to detect anomalies in other averaged signals further cause the computing system to:

average a surveillance signal to produce an averaged surveillance signal;

monitor the averaged surveillance signal for anomalies with the trained machine learning model by predicting values for the averaged surveillance signal and comparing the predicted values to actual values of the averaged surveillance signal; and detect an anomaly in the averaged surveillance signal that indicates that an anomaly is present in the surveillance signal; wherein the anomaly in the averaged signal is detected based on a difference between the predicted values and the actual values.

19. The computing system of claim 18, wherein the instructions further cause the computing system to receive the surveillance signal as a stream of surveillance data arriving from a sensor in a real-time flow, wherein the surveillance signal is averaged as the surveillance signal arrives.

20. The computing system of claim 15, wherein the instructions further cause the computing system to:

parse values of the training signal in a first pass to identify the locations and values of the extrema; and parse values of the training signal in a second pass to average the training signal.

* * * * *